(12) United States Patent
Bombaugh et al.

(10) Patent No.: US 11,167,319 B2
(45) Date of Patent: Nov. 9, 2021

(54) SYSTEMS AND METHODS FOR HIGH THROUGHPUT SORTING

(71) Applicant: United States Postal Service, Washington, DC (US)

(72) Inventors: Scott R. Bombaugh, Burke, VA (US); Tuan A. Le, Fairfax, VA (US); Charles P. McLellan, Fairfax, VA (US); Christopher M. Stratton, Springfield, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 16/846,157

(22) Filed: Apr. 10, 2020

(65) Prior Publication Data

US 2020/0238340 A1    Jul. 30, 2020

Related U.S. Application Data

(63) Continuation of application No. 15/967,870, filed on May 1, 2018, now Pat. No. 10,946,417, which is a
(Continued)

(51) Int. Cl.
*B07C 5/36* (2006.01)
*B07C 3/18* (2006.01)
(Continued)

(52) U.S. Cl.
CPC .................. *B07C 5/36* (2013.01); *B07C 3/02* (2013.01); *B07C 3/08* (2013.01); *B07C 3/18* (2013.01);
(Continued)

(58) Field of Classification Search
CPC ........ B65G 47/38; B65G 47/44; B65G 47/46; B65G 47/49; B65G 47/493; B65G 47/644;
(Continued)

(56) References Cited

U.S. PATENT DOCUMENTS 2,937,739 A    5/1960    Levy
3,082,855 A    3/1963    Ernst et al.
(Continued)

FOREIGN PATENT DOCUMENTS

EP    0351778 A2    1/1990
JP    2004-513783    5/2004
WO    WO 96/36443 A1    11/1996

OTHER PUBLICATIONS

International Preliminary Report on Patentability dated Jul. 17, 2018 in International Application No. PCT/US2017/013003.
(Continued)

*Primary Examiner* — Joseph C Rodriguez
(74) *Attorney, Agent, or Firm* — Knobbe Martens Olson & Bear LLP

(57) ABSTRACT

A high throughput sorting device is disclosed. The device includes a first sorter and a second sorter, each of the first and second sorters having a plurality of cells each configured to support, carry, and deposit an item. The device can also include at least one shared chute extending below a portion of the first sorter and a portion of the second sorter. The at least one chute can be configured to receive an item deposited by each of the plurality of cells and transport the item to an endpoint. The device can also include a base configured to support the at least one shared chute and the first and second sorters.

12 Claims, 20 Drawing Sheets

Related U.S. Application Data continuation of application No. 15/403,693, filed on Jan. 11, 2017, now Pat. No. 9,962,743.

(60) Provisional application No. 62/277,837, filed on Jan. 12, 2016.

(51) Int. Cl.

| | | |
|---|---|---|
| *B07C 3/08* | (2006.01) | |
| *B07C 3/02* | (2006.01) | |
| *B65G 47/38* | (2006.01) | |
| *B65G 47/96* | (2006.01) | |
| *B65G 47/44* | (2006.01) | |
| *B07C 3/00* | (2006.01) | |

(52) U.S. Cl.
CPC ............. *B65G 47/38* (2013.01); *B65G 47/44* (2013.01); *B65G 47/967* (2013.01); *B07C 3/008* (2013.01)

(58) Field of Classification Search
CPC ...... B65G 47/647; B65G 47/76; B65G 47/78; B65G 47/96; B65G 47/967; B65G 2812/016; B65G 2812/017; B65G 17/065; B65G 17/067; B65G 17/34; B65G 17/345; B07C 3/003; B07C 3/008; B07C 3/02; B07C 3/06; B07C 3/065; B07C 3/08; B07C 3/082; B07C 5/36; B07C 5/362; B07C 5/38
See application file for complete search history.

(56) References Cited

U.S. PATENT DOCUMENTS

| | | | |
|---|---|---|---|
| 3,348,359 A | 10/1967 | Lasbrey | |
| 3,759,381 A | 9/1973 | Mercadie et al. | |
| 4,509,635 A | 4/1985 | Emsley et al. | |
| 4,804,078 A | 2/1989 | Scata' | |
| 4,984,676 A | 1/1991 | Michel | |
| 5,190,162 A | 3/1993 | Hartlepp | |
| 5,207,331 A | 5/1993 | Teegarden et al. | |
| 5,372,235 A * | 12/1994 | Gennari | B65G 17/345 198/890.1 |
| 5,387,260 A | 2/1995 | Gennari et al. | |
| 5,435,429 A | 7/1995 | Van Den Goor | |
| 5,570,773 A * | 11/1996 | Bonnet | B65G 17/345 198/370.04 |
| 5,901,855 A | 5/1999 | Uno et al. | |
| 6,095,314 A | 8/2000 | Fortenbery | |
| 6,126,017 A | 10/2000 | Hours | |
| 6,189,702 B1 | 2/2001 | Bonnet | |
| 6,259,967 B1 * | 7/2001 | Hartlepp | B65G 11/081 198/444 |
| 6,505,730 B1 | 1/2003 | Linder | |
| 6,533,099 B2 * | 3/2003 | Bonham | B65G 47/44 198/360 |
| 6,576,857 B1 | 6/2003 | De Leo et al. | |
| 6,688,083 B1 * | 2/2004 | Fitzgibbons | B07C 3/06 271/207 |
| 6,688,459 B1 | 2/2004 | Bonham et al. | |
| 6,881,916 B2 | 4/2005 | McLaughlin et al. | |
| 6,897,395 B2 | 5/2005 | Shiibashi et al. | |
| 6,946,612 B2 | 9/2005 | Morikawa | |
| 7,259,345 B2 | 8/2007 | Kechel | |
| 7,728,244 B2 | 6/2010 | De Leo et al. | |
| 7,905,344 B2 | 3/2011 | Fritsche et al. | |
| 8,230,141 B2 * | 7/2012 | Zimmermann | B07C 3/02 710/53 |
| 8,269,125 B2 | 9/2012 | Roth et al. | |
| 8,983,648 B2 | 3/2015 | Kreitmeier et al. | |
| 9,415,422 B2 * | 8/2016 | Worth, II | B07C 3/08 |
| 9,511,954 B2 | 12/2016 | Hopman et al. | |
| 9,592,989 B2 | 3/2017 | Herrmann | |
| 9,878,852 B2 | 1/2018 | Sorensen et al. | |
| 9,962,743 B2 | 5/2018 | Bombaugh et al. | |
| 10,065,807 B1 | 9/2018 | Garrett et al. | |
| 10,301,121 B1 | 5/2019 | Hoffman et al. | |
| 10,384,234 B2 | 8/2019 | Hopman et al. | |
| 10,556,253 B2 | 2/2020 | Khan | |
| 10,946,417 B2 * | 3/2021 | Bombaugh | B07C 3/18 |
| 10,967,405 B2 * | 4/2021 | Bombaugh | B07C 3/02 |
| 2004/0073333 A1 | 4/2004 | Brill | |
| 2004/0153208 A1 | 8/2004 | Wilke | |
| 2005/0067331 A1 | 3/2005 | De Leo et al. | |
| 2011/0119414 A1 | 5/2011 | Zimmermann | |
| 2012/0095591 A1 | 4/2012 | Wilson | |
| 2016/0136692 A1 | 5/2016 | Bombaugh | |

OTHER PUBLICATIONS

International Search Report and Written Opinion dated Jun. 30, 2017 in International Application No. PCT/US2017/013003.

* cited by examiner

SYSTEMS AND METHODS FOR HIGH THROUGHPUT SORTING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 15/967,870, Filed May 1, 2018, which is a continuation of U.S. patent application Ser. No. 15/403,693, filed Jan. 11, 2017, now U.S. Pat. No. 9,962,743, which in turn, claims the benefit of priority under 35 U.S.C. § 119(e) of U.S. Provisional Application No. 62/277,837, filed on Jan. 12, 2016, and entitled "SYSTEMS METHODS FOR HIGH THROUGHPUT SORTING," the entire disclosure of each of which is incorporated herein by reference in its entirety.

BACKGROUND

Field

This disclosure relates to sorting a plurality of items. More specifically, it relates to systems and methods for high throughput sorting of items to a plurality of destinations.

Description

Quickly sorting a large plurality of items, however, is often difficult to do in an efficient and cost-effective manner. As one example, mail delivery operations can involve receiving, unloading, transporting, loading, and sorting thousands of items, which can include letters, flats, parcels, and the like, into trays or bins for further processing and/or delivery. The high volume of mail items processed and sorted increases the cost and complexity of the sorting means and methods involved. Inefficient sorting systems and methods can lead to significant losses of time and/or increased costs over the course of a day or year. Moreover, the sorting apparatuses themselves take up space in a processing facility, which can be limited.

Mail delivery is merely one example of an industrial application that relies on sorting and processing large quantities of items. Others can include, but are not limited to, retail operations with large inventories and high daily sales, high volume component manufacturers, such as consumer goods, baggage sorting, and importing operations with high volumes of imports needing sorting and receiving daily.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for sorting items.

In one aspect described herein, a high throughput sorting device comprises a sorter including a first sorter section parallel to a second sorter section, a plurality of cells disposed on the sorter and configured to move along the sorter, each cell including a pair of doors forming a platform configured to: support an item in a closed configuration, and deposit the item through the cell in an open configuration; a plurality of chutes, each chute extending below the first sorter section and the second sorter section, the plurality of chutes configured to receive items deposited through the plurality of cells and transport the items to a plurality of sorting destinations; and a base configured to support the first sorter section, the second sorter section, and the plurality of chutes.

In some embodiments, the sorter comprises a first loop including the first sorter section; and a second loop including the second sorter section, wherein the first loop is continuous with the second loop such that a cell moving along the sorter passes the first sorter section and the second sorter section.

In some embodiments, the sorter comprises a first loop including the first sorter section; and a second loop including the second sorter section, wherein the first loop is distinct from the second loop such that a cell moving along the first loop does not pass the second sorter section.

In some embodiments, a plurality of bins are positioned at endpoints of the plurality of chutes, each bin associated with a sort destination.

In some embodiments, an item can be deposited onto each of the plurality of chutes at a first location in the first sorter section and a second location in the second sorter section.

In some embodiments, an item deposited onto a chute at the first location and an item deposited onto the chute at the second location are each transported by the chute to the same sort destination.

In some embodiments, each of the plurality of chutes is supported by the base below the first sorter section and the second sorter section at an inclined angle relative to ground such that an item deposited thereon slides to an endpoint of the chute.

In some embodiments, at least one of the plurality of chutes, a distance between the first sorter section and the chute is less than a distance between the second sorter section and the chute.

In some embodiments, the plurality of chutes includes a first chute that is inclined to a first side of the device and the second chute that is inclined to a second side of the device, the second side being opposite the first side.

In some embodiments, the first chute and the second chute are configured to transport items deposited thereon in opposing directions.

In some embodiments, the system further comprises a first inductor located adjacent to the first sorter section of the sorter and configured to load items onto the plurality of cells during the first sorter section; and a second inductor located adjacent to the second sorter section of the sorter and configured to load items onto the plurality of cells during the second sorter section.

In some embodiments, for each of the plurality of cells, the pair of doors comprise a leading door and a trailing door of the set and wherein the trailing door is shorter than the leading door.

Another aspect describe herein relates to a method of high throughput sorting, comprising placing a first item onto a first cell on a first section of a sorter; moving the first cell along the sorter to a first location positioned over a chute configured to guide items deposited on the chute to a sort destination; depositing the first item onto the chute from the first cell at the first location such that the chute guides the first item to the sort destination; placing a second item onto a second cell on a second section of the sorter; moving the second cell along the sorter in a direction opposite of the first cell, to a second location positioned over the chute, the second location being different from the first location; depositing the second item onto the chute from the second cell at the second location such that the chute guides the second item to the sort destination.

In some embodiments, the method further comprises associating the sort destination with a delivery point; and determining delivery destinations for the first and second items by scanning the first and second items to read first and second destination information corresponding to the delivery point located on the first and second items.

In some embodiments, depositing the first item onto the chute from the first cell at the first location comprises associating the first cell with the first item in a memory and associating the second cell with the second item in the memory; determining when the position of the first cell containing the first item corresponds to the chute leading to the sort destination; depositing the first item on the chute from the first cell; determining when the position of the second cell containing the second item corresponds to the chute leading to the sort destination; depositing the second item on the chute from the second cell In some embodiments, depositing the first and second items on the chute comprises opening a set doors of the first and second cells when the first and second cells are positioned over the chute.

In some embodiments, the first section of the sorter and the second section of the sorter are disposed parallel to each other.

In some embodiments, the first section of the sorter and the second section of the sorter are configured to move the first and second cells in parallel and opposite directions.

In some embodiments, a first portion of the chute is disposed under the first section of the sorter to receive items from the first cell, and a second portion of the chute is disposed under the second section of the sorter to receive items from the second cell, wherein the first and second portions of the chute are continuous, and the chute is disposed under the first and second sections of the sorter at an angle in order to guide the first and second items to the sort destination.

In another aspect described herein, a sorting device comprises means for placing a first item onto a first cell on a first section of a sorter; means for moving the first cell along the sorter to a first location positioned over a chute configured to guide items deposited on the chute to a sort destination; means for depositing the first item onto the chute from the first cell at the first location such that the chute guides the first item to the sort destination; means for placing a second item onto a second cell on a second section of the sorter; means for moving the second cell along the sorter to a second location positioned over the chute, the second location different from the first location; means for depositing the second item onto the chute from the second cell at the second location such that the chute guides the second item to the sort destination.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
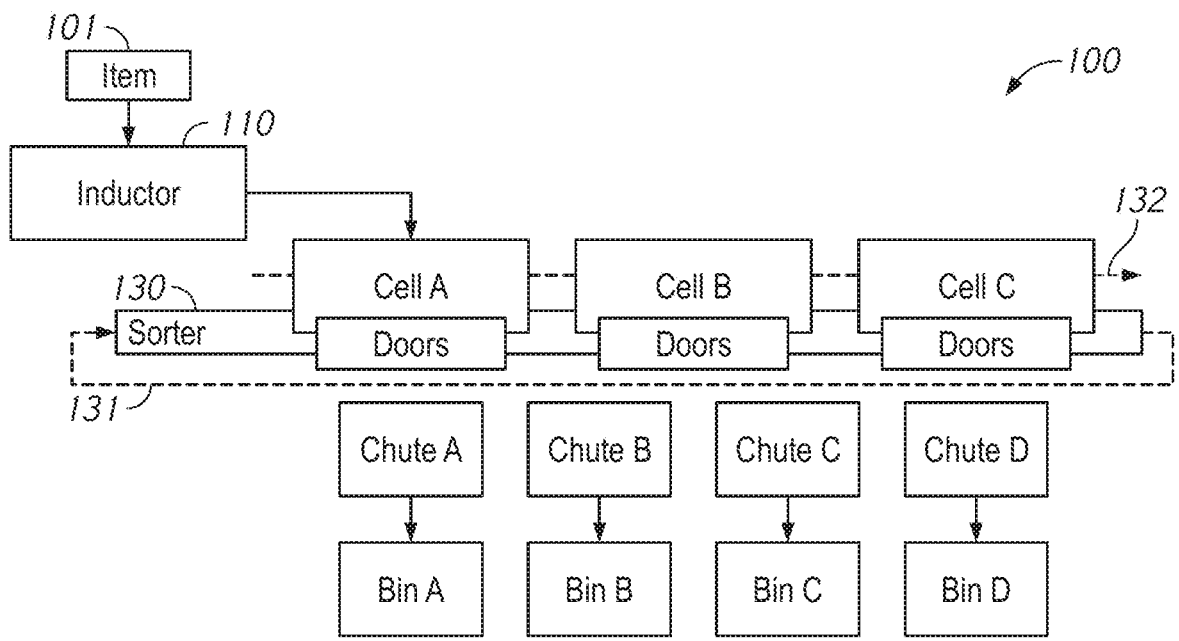
FIG. 1 is a block diagram of an embodiment of a sorting system including a set of dedicated bins.

In the following detailed description, reference is made to the accompanying drawings. In the drawings, similar symbols typically identify similar components, unless context dictates otherwise. Thus, in some embodiments, part numbers can be used for similar components in multiple figures, or part numbers can vary from figure to figure. The illustrative embodiments described herein are not meant to be limiting. Other embodiments can be utilized, and other changes can be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily all refer to the same embodiment, nor are separate or alternative embodiments necessarily mutually exclusive. Various features are described herein which can be exhibited by some embodiments and not by others. Similarly, various requirements are described which can be requirements for some embodiments but cannot be requirements for other embodiments.

In some embodiments, the systems described herein provide for faster and more efficient sorting of items, such as, for example, pallets, trunks, boxes, articles of mail, etc. In some embodiments, the articles of mail can include items of various sizes and shapes, such as letters, flats, and parcels. Although the present disclosure describes, by way of example, systems and devices for sorting items of mail, it will be apparent to one of skill in the art that the disclosure is not limited thereto. For example, the development described herein can have application in a variety of manufacturing, assembly, distribution, or other sorting applications and the term item can refer to any object requiring sorting.

Sorting can be required at any one of a plurality of different levels present in a distribution network. For example, a distribution network can include processing facilities such as regional distribution facilities, hubs, and unit delivery facilities. For example, a nationwide distribution network can comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service (USPS), the unit delivery facility can be associated with a ZIP code. The unit delivery facility receives items from local senders and from hub level facilities or regional distribution facilities. The unit delivery facility also sorts and stages the items intended for delivery to destinations within the unit delivery facility's coverage area. As described above, sorting of the items occurs at each level in the network and thus can be critical to the efficient operation thereof.

At each level, items can be sorted according to item type, delivery end point, class of service, or any other criteria. Items which are intended for delivery within a defined geographic area near the processing facility, or intended for delivery to a particular destination or plurality of destinations, can be sorted by separating these items from items with other, different delivery end points. Items intended for delivery to a destination outside of the defined geographic area, particular destination or plurality of destinations can be sorted and sent to another processing facility nearer their delivery end points.

Any level of the distribution network can use automated processing equipment to sort items. For example, where the distribution network is the USPS, every day a processing facility receives a very high volume of items, such as letters, flats, and parcels, which must be sorted for processing. Sorting can be accomplished using automated equipment that can scan, read, or otherwise interpret a destination end point located on or associated with each item processed. The destination end point can be encoded in a computer readable code, such as a bar code printed on or affixed to the item. In some embodiments, the destination end point can be read by taking an image of the item and performing an optical character recognition (OCR) process on the image, and determining the delivery end point from the OCR'd address. This information is then used to sort the item into a particular group or bin for further processing or delivery.

The systems and methods described herein are useful for efficiently and quickly sorting items and can be included at any level of the distribution network described above, or in any other application or operation requiring sorting of items.

FIG. 1 is a block diagram of an embodiment of a sorting system 100 for sorting a plurality of items 101 into a set of dedicated bins A-D. The sorting system 100 includes an inductor 110, a sorter 130 including a plurality of cells A-C, a plurality of chutes A-D, and a plurality of dedicated bins A-D. These elements are represented symbolically in FIG. 1 and a person of ordinary skill in the art will understand how these elements can be implemented to construct the sorting system 100 according to the principles described herein. The number of elements shown in FIG. 1 provides only one embodiment of the system 100. For example, while FIG. 1 shows three cells A-C, other embodiments of the system can include greater or fewer than three cells.

The inductor 110 receives the items 101 for sorting. In some embodiments, the items 101 arrive at the inductor 110 in a random or unsorted order. As the items 101 are moved through the sorting system 100, starting at the inductor 110, the items 101 are sorted into the correct bins A-D. In some embodiments, the inductor 110 is positioned adjacent to the sorter 130 so that the inductor 110 can load the items 101 one by one onto the cells A-C on the sorter 130. In some embodiments, the inductor 110 can include a plurality of lanes so that the inductor 110 can load items onto more than one cell A-C of the sorter 130 at a time (for example, by placing or otherwise depositing an item onto a cell with each lane of the sorter 130). In some embodiments, the inductor 110 loads only a single item 101 onto each of the cells A-C. In some embodiments, the inductor 110 loads more than one item 101 onto each of the cells A-C.

In some embodiments, each of the cells A-C can include a platform or other surface onto which items can be placed. In some embodiments, the platform of the cells A-C is bounded by walls to help maintain the item on the cell. In some embodiments, the platform includes doors (such as the bomb-bay style doors 341, 342 shown in FIGS. 3B-3D) that support an item when closed and drop and item through the cell when open.

In some embodiments, the sorter 130 can be a conveyor or carousel configured to move the plurality of cells A-C around the sorter 130. The sorter 130 can include a track, a drive mechanism, and the plurality of cells A-C. The track can be configured to support the plurality of cells A-C in a moveable fashion. The drive mechanism moves the cells A-C along the track. The dashed line 131 in FIG. 1 indicates that the sorter 130 can be configured as a loop so that as the cells A-C travel around the length of the sorter 130 they return to their original positions after one complete revolution. A person of ordinary skill in the art will understand that the sorting system 100 can be implemented with a wide variety of types and configurations of sorters.

As illustrated schematically in FIG. 1, the sorter 130 is positioned above a plurality of chutes A-D. In some embodiments, the chutes A-D can be inclined slides, conveyors, belts, or any other suitable mechanism for moving an item from one location to another. In some embodiments, the chutes A-D are passive, for example, inclined slides, that move items placed thereon from one location to another without requiring any powered components. In other embodiments, the chutes A-D are active, for example, conveyor belts that are driven by motors. In general, the chutes A-D are positioned so that at least a portion of each chute A-D is below or adjacent to a portion of the sorter 130. A specific embodiment of a chute is shown in FIG. 3G and described below. As the cells A-C are moved around the sorter 130, the cells A-D pass over the chutes A-D. In some embodiments, the sorter 130 and cells A-C are not positioned over the chutes A-D. For example, in some embodiments, the sorter 130 and cells A-C are positioned adjacent to the chutes A-D. The bins A-D can be positioned at the end point of each of the chutes A-D, such that an item placed on one of chutes A-D is routed to the corresponding bin A-D positioned at the end of the chute. The bins A-D in FIG. 1 are referred to as "dedicated bins" because each of the bins A-D corresponds with a particular of the chutes A-D and each of the chutes A-D is positioned under only a single portion of the sorter 130. That is, for a dedicated bin, there is a single location on the sorter 130 where an item can be deposited onto a particular chute to reach a particular bin. The bins A-D can be any type of receptacle for holding sorted items and can be specifically configured and adapted by one of ordinary skill in the art to be particularly suited to the types of items being sorted. In some embodiments, the chutes A-D can be omitted and the bins A-D can be positioned directly below the sorter 130.

Figure 2:
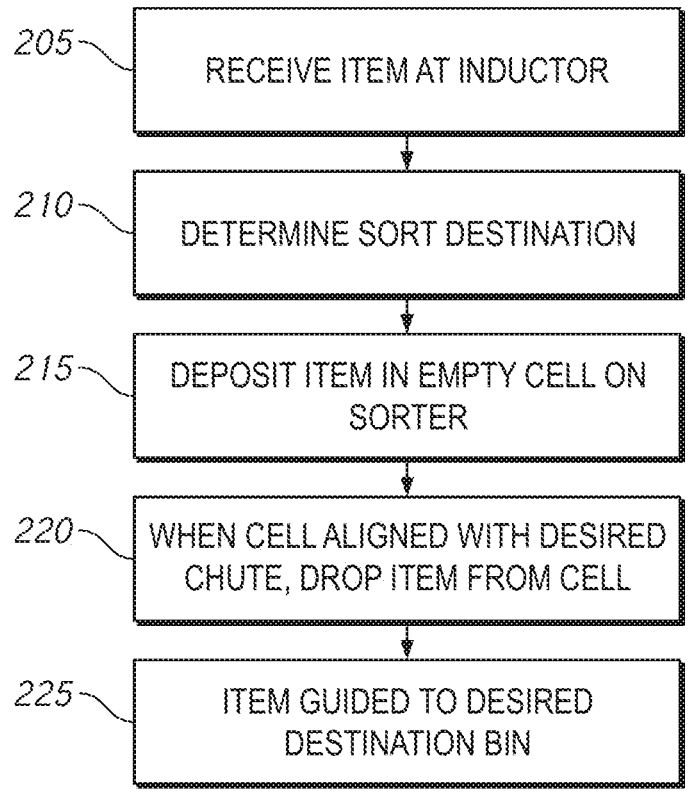
FIG. 2 is a flowchart illustrating an implementation of a method for using a sorting system to sort items into desired bins.

FIG. 2 is a flowchart illustrating an implementation of a method 200 for using the sorting system 100 of FIG. 1 to sort items 101 into the bins A-D. Although, the following description of FIG. 2 is made in reference to the sorting system 100 of FIG. 1, the method 200, as well as modified versions thereof, can be used with any of the various sorting systems described herein. The method 200 will be described in reference to a single item 101 for purposes of example; however, in general the sorting system 100 will be used to sort a large number of items by repeating the same method for each cell of the sorter.

Considering FIGS. 1 and 2 together, beginning at step 205, an item 101 is received at the inductor 110. The method 200 then moves to step 210, wherein the sort destination for the item 101 is determined. In some embodiments, the determination of the sort destination can be made with an automated process. For example, the sorting system 100 can include an imaging system configured to capture an image of the item 101 while on the inductor 110. The image of the item can then be analyzed using optical character recognition (OCR) techniques to determine information regarding the destination of the item 101. If the item 101 is a package being shipped, an image of the package can be analyzed to determine the destination address of the package. The sorting system 100 can then identify a single bin of the plurality of bins A-D into which the package should be sorted for further processing. The bin can correspond to a delivery point, such as an address, a zip code, a group of addresses, a subsequent distribution facility, and the like. In some embodiments, the item 101 can include a unique bar or QR code and the sorting system 100 can include a bar or QR code scanner. The item 101 can be scanned using the scanner at the inductor 110 and the system can use the coded information to determine a sort location, for example, one of the bins, for the item 101, based on the intended delivery point of the item 101. A person of skill in the art will understand that various other methods for determining the sort destination for a particular item can be used with the sorting system 100 and the method 200. Further, in some embodiments, the step 210, regarding the determination of the sort destination, can occur before the item 101 is received at the inductor, for example, by scanning the item 101 with a hand scanner before the item is loaded onto the inductor 110. In some embodiments, the sort destination for each item 101 is recorded in a database. For example, if item 101 is determined to have a sort destination of bin D, a database entry can be created that reflects this.

The method 200 then moves to step 215, wherein the inductor 110 deposits the item 101 onto an empty cell of the plurality of cells A-C. For example, the inductor 110 can hold the item 101 until an empty cell of the plurality of cells A-C, traveling along the sorter 130, is positioned adjacent to the inductor 110. When the cell is adjacent to the inductor 110, the inductor transfers the item onto the cell. In some embodiments, the inductor 110 deposits the item 101 on the cell without stopping the motion of the cell around the sorter 130. The item 110 then begins traveling around the loop of the sorter 130 passing over the chutes A-D, which are positioned below the sorter 130. In some embodiments, the item 101 is deposited onto a cell containing other items destined for the same sort destination. In some embodiments, the cell onto which the item 101 is deposited is identified and associated with the item 101. For example, if the item 101 is deposited onto cell B, a database can be updated to indicate that cell B is now carrying item 101.

The method 200 then moves to step 220, wherein when the cell carrying the item 101 is aligned above (or adjacent to) the desired chute of the plurality of chutes A-D that will carry the item 101 to the appropriate bin of the plurality of bins A-D corresponding to the determined sort destination, the item 101 is transferred (e.g., dropped) from the cell onto the correct chute. In some embodiments, the item 101 is dropped by opening the bomb-bay doors of the cell when the cell is positioned over the chute (for example, as described below with reference to FIGS. 3B-3D). In another embodiment, the item 101 is transferred from the cell by tilting the cell such that the item 101 is dumped onto the correct chute. In some embodiments, the step 220 is performed without stopping the motion of the cell around the sorter 130. With the cell now empty, a new item can be deposited onto the cell when the cell returns to a position adjacent to the inductor 110. Continuing the example, from above, when cell B (carrying the item 101) is positioned over chute D associated with bin D (the determined sort destination of item 101) cell B can drop the item 101 onto chute D to deposit the item into bin D. In some embodiments, the database entry can be updated to reflect that item 101 has been deposited in bin D and that cell B is now empty.

The method 200 then moves to step 225, wherein the item 101 that was dropped from the cell onto the chute is guided by the chute to the bin that corresponds to the sort destination determined at step 210.

The steps of method 200 can be executed repeatedly for each item 101 received at the inductor 110, such that each empty cell that passes the inductor 110 is loaded with a new item 101 to be sorted. As the cells A-C travel around the sorter 130, they pass over chutes A-D corresponding to all of the bins A-D. If the bins A-D represent all possible sort destinations, the items 101 must pass over a bin corresponding to their sort destination during one revolution of the sorter 130. Thus, after a cell is loaded at the inductor 110, the item 101 carried thereon will be deposited into one of bins A-D by the time the cell returns to the inductor 110. The cell can then be reloaded and the process repeated.

A theoretical throughput of the sorting system 100 can be calculated that represents the number of items that can be deposited by a single cell of the system per revolution of the sorter 130. For the sorting system 100 illustrated in FIG. 1, in some embodiments, only a single item 101 can be deposited per cell per revolution of the sorter 130. Thus, the theoretical throughput of the sorting system 100 is one. This is apparent because the sorting system 100 includes only a single inductor 110 and each cell can only be loaded one time per revolution.

In some embodiments, factors that are relevant to determining how many items the sorting system 100 can process can include the speed and capacity of the system. The speed of the system 100 is the velocity at which the sorter 130 moves the cells A-C. In some embodiments, the speed of the system 100 can be limited by the rate at which the inductor 110 can load the cells A-C and/or the speed at which the sorter 130 can drop the items to be sorted onto the chutes A-D. If the speed of the sorter 130 is too fast, it can be difficult to correctly drop items onto the chutes A-D. The capacity of the sorting system 100 is the number of cells A-C on the sorter 130. Capacity can generally be limited by the physical size of the sorting facility where the sorting system is installed. Moreover, it is important to note that increasing the capacity of the sorting system can increase the total time it takes for a cell to travel around the sorter 130.

Figure 3A:
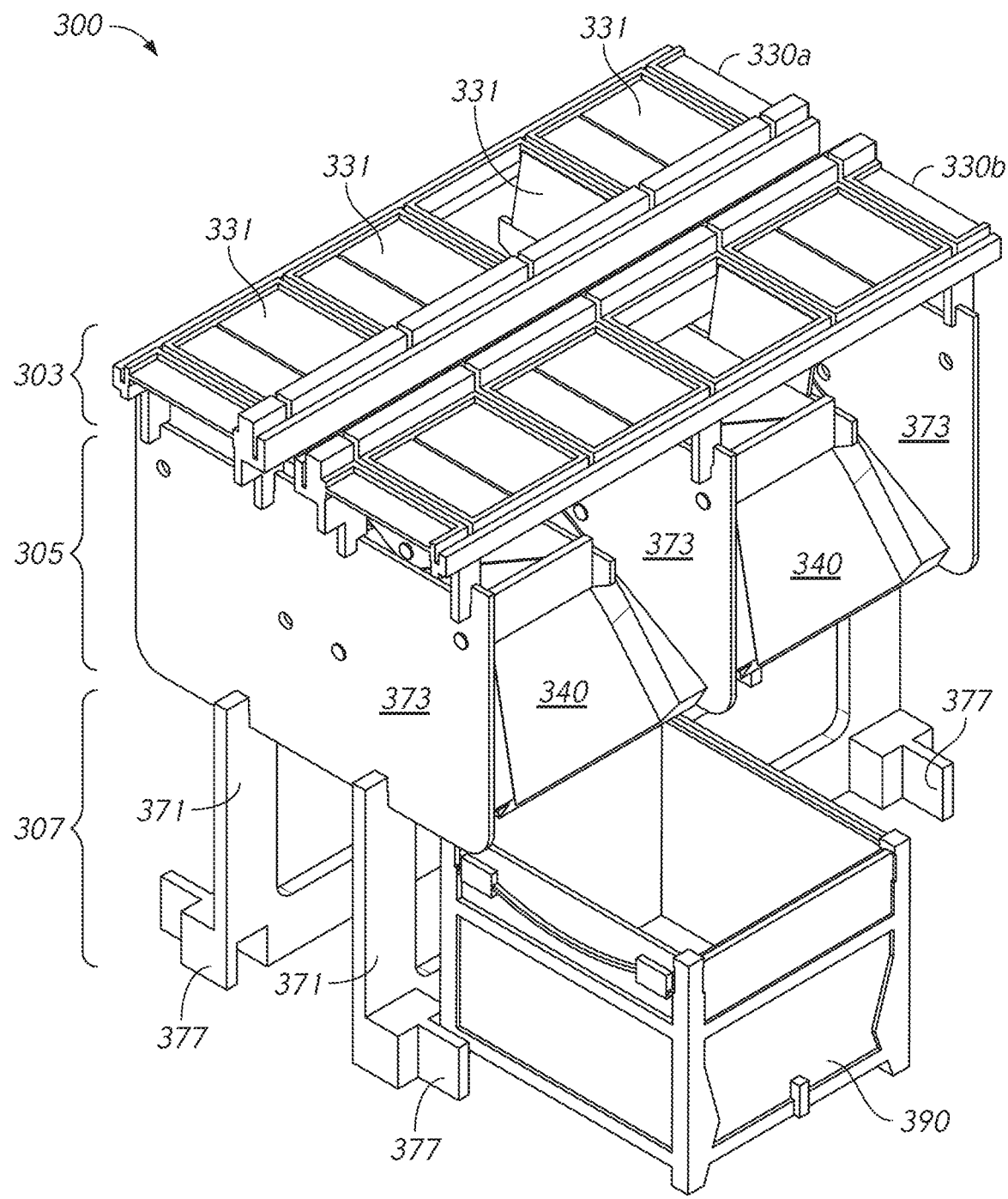
FIG. 3A is a perspective view of an embodiment of a section of a high throughput sorting device for use with two sorter sections and configured with a chute system for feeding a set of shared bins. The chute system can allow items on either sorter section to reach any of the shared bins.

In some embodiments, multiple sorters or multiple sections of a single sorter can be aligned (for example, in parallel), as shown in FIG. 3A. Parallel alignment of sorters or sorter sections can allow for efficient use of space in a sorting system and/or, as will be described more fully below, allow for sorting items on either sorter or sorter section into a set of shared bins. As used herein, the term "shared bins" refers to bins that are accessible from multiple locations and/or multiple loops of the sorting system, for example, bins that are accessible from locations on each of a pair of parallel sorters or sorter sections.

FIG. 3A is a perspective view of an embodiment of a portion of high throughput sorting device 300, for use with two parallel sorters 330a and 330b, that is configured with a chute system 305 for feeding a set of shared bins 390 (in FIG. 3A only a single bin 390 is shown; however, bins can be positioned below each of the chutes). The chute system 305 allows items on either sorter 330a or 330b to be sorted into any of the shared bins 390. The portion depicted in FIG. 3A is only a section of a sorting apparatus that can include one or more section similar to that shown in FIG. 3A.

The sorting device 300 includes a portion of two parallel sorters 330a and 330b, each including a plurality of cells 331 configured to carry and deposit items into particular bins based on item destinations. In some embodiments, the two parallel sorters 330a and 330b can move cells 331 in the same direction or in opposite directions. In some embodiments, the two parallel sorters 330a and 330b can be sections of two independent sorters, each forming its own integral loop. In some embodiments, the sorters 330a and 330b can be sections of the same sorter configured to loop back on itself to provide the parallel arrangement. In the embodiment shown, the sorting device 300 includes a section of each sorter 330a and 330b that includes four cells 331. It can be helpful to consider the length of the portion of the sorting device 300 shown in FIG. 3A then, as a four-cell unit, as this can be an indicator of the footprint or length of the portion of the sorting device 300. In some embodiments, each cell 331 includes a platform onto which an item can be deposited. The platform can be bounded on each side by a wall. The walls can help maintain items on the platform and separate the platform of each cell 331 from the adjacent cells 331. The sorters 330a and 330b are positioned in a sorter portion 303 of the sorting device 300. The sorter portion 303 can be located at the top of the sorting device 300. This placement is particularly advantageous in sorting systems that rely at least partially on gravity to move the items to be sorted from the sorter to the bins. For example, the doors of a cell 331 of the sorting device 300 can be opened to drop an item carried thereon onto a chute 340 for sorting.

In some embodiments, the cells 331 of the sorters 330a, 330b can include a door or a set of doors. The doors can be a set of bomb-bay style doors configured to open at the center of the platform of the cell, as will be described with regard to FIGS. 3B-3D. In another embodiment, the cells 331 do not include doors, but rather are configured to move the platform from a relatively horizontal position to an inclined position so that the item slides out of the cell and onto the chute or into the bin. The cells 331 move along the sorter 330a or 330b. In some embodiments, each of the plurality of cells 331 is substantially similar or the same as each of the other of the plurality of cells. In other embodiments, however, one or more of cells 331 can be of a different shape or size than the other cells. While FIG. 3A shows four cells 331 for each sorter 330a, 330b, it will be appreciated that fewer or greater numbers of cells can be used in with the sorting device 300. In general, as additional cells are added to the sorting system 300, the length of the sorter 330a and the sorting device 300 is increased to accommodate the additional cells.

As shown in FIG. 3A, the chute system 305 (including chutes 340) is supported by a base portion 307. The base portion includes legs 371 and feet 377 that support one or more side supports 373. The side supports 373 can be rigid, substantially planary structures configured in size and shape to support the chutes 340 and the sorters 330a, 330b.

Figure 3B:
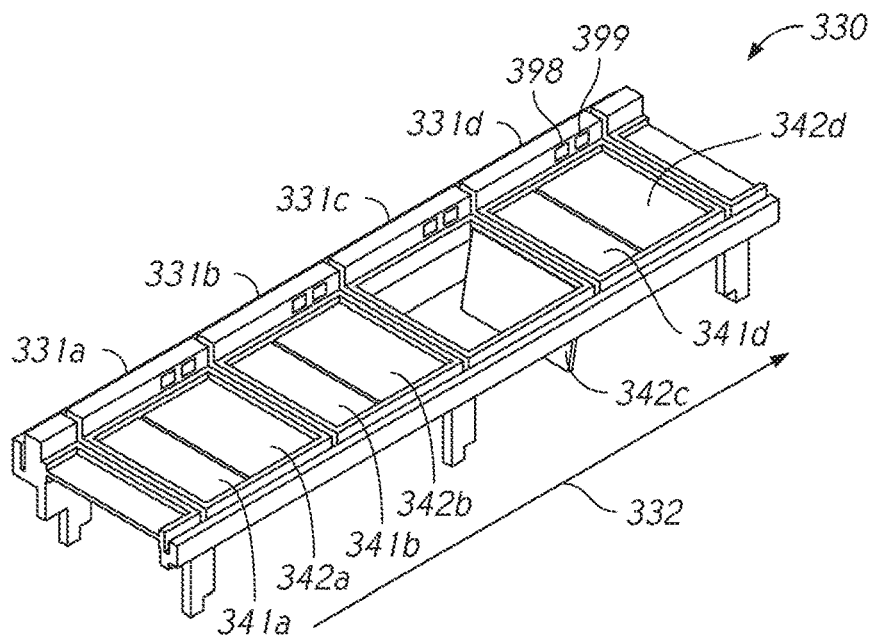
FIG. 3B is a perspective view of an embodiment of one of the sorter sections from FIG. 3A where each of the cells of the sorter section has bomb-bay style doors with the trailing door having a shorter length than the leading door.
Figure 3C:
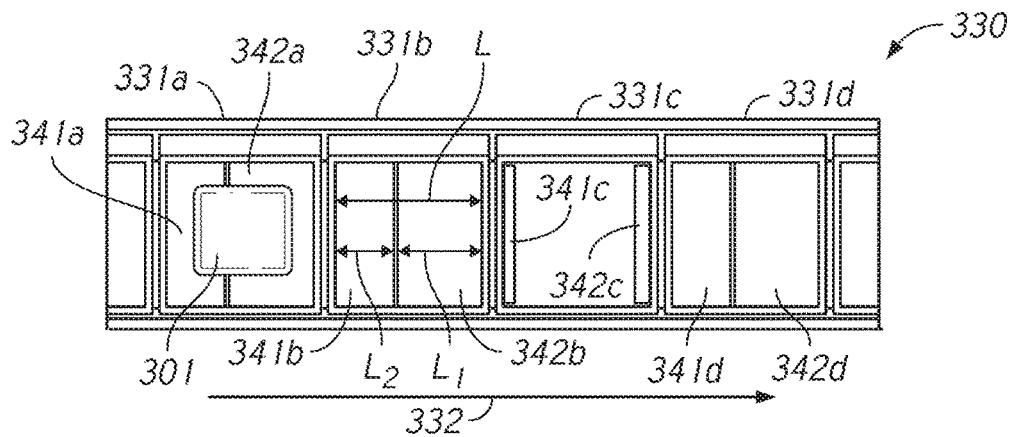
FIG. 3C is a top view of the sorter sections of FIG. 3B.
Figure 3D:
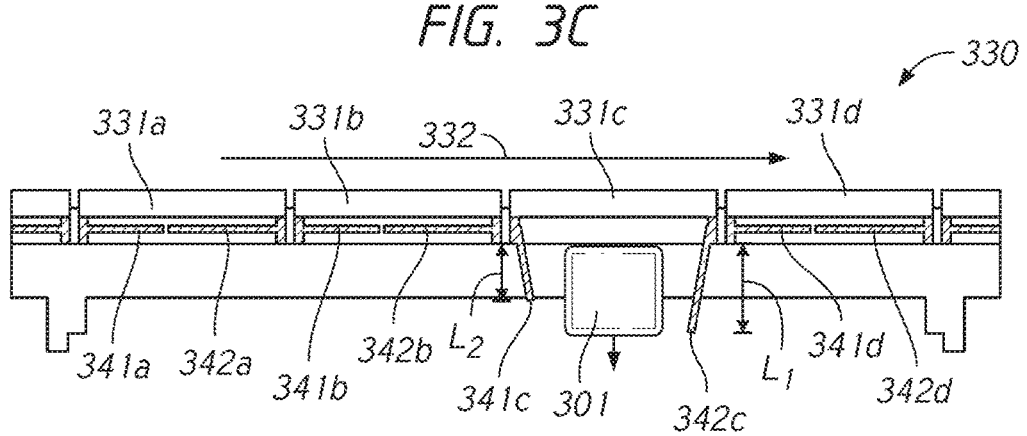
FIG. 3D is a side view of the sorter sections of FIG. 3B.

FIG. 3B shows a section of an embodiment of a sorter 330 where each of the cells A-D of the sorter 330 has bomb-bay style doors (for example doors 341b, 342b of cell B) with the trailing door (341b) having a shorter length than the leading door (342b). FIGS. 3C and 3D show top and side views of the section of the sorter 330 of FIG. 3B.

As shown, the sorter 330 includes four cells 331a-d. In general, the sorter 330 can be configured as a loop as previously described and can include more than four cells. The four cells 331a-331d in FIGS. 3B-3D are provided for example only and show only a section of the total sorter 330. The sorter 330 is configured so that the cells 331a-d travel along the sorter 330 in the direction 332. Each cell 331a-d includes a pair of bomb-bay or clamshell style doors 341, 342. The cells 331a, 331b, and 331d are shown with the bomb-bay doors 341, 342 closed. With the doors 341, 342 closed, the cell creates a platform for supporting an item deposited thereon. In FIG. 3B, the cell 331a is shown supporting an item 301. The cell 331c is shown with the bomb-bay doors 341c, 342c open. When the doors are opened, an item supported by the cell can be dropped through the opening. As previously described, the item can be dropped onto a chute or into a bin, for example. The bomb-bay doors 341, 342 are illustrated as swinging open around an axis that is transverse to the direction 332 of travel. However, in some embodiments, the doors can swing open in around an axis parallel to the direction 332.

In some embodiments, the bomb-bay doors 341, 342 open in opposite directions and include a leading door and a trailing door having different lengths. For example, in the cell 331b, which is shown with doors 341b, 342b closed, the trailing door 341b has a length $L_2$ that is shorter than the leading door 342b, which has a length $L_1$. The combined length of $L_1$ and $L_2$ makes up the total length L of each cell 331. A sorter cell configured with doors of different lengths, as is the cell 331b, can provide particular advantages. For example, the doors of different lengths can allow the sorter 330 to be operated at a higher speed. This advantage will become apparent to a person of ordinary skill in the art considering the cell 331c, shown with doors 341c and 342c open. As shown in FIG. 3D, as an item 301 is dropped from the open cell 331c, it must clear the trailing door 341c, which is still moving forward along the sorter 330. Decreasing the length $L_2$ of the trailing door 341c, decreases the distance the item 301 must fall to clear the trailing door 341c. Moreover, as the distance the item 301 must fall to clear the trailing door 341c decreases, the speed at which the sorter 330 can move the cell 331c is increased. In some embodiments, this can allow for faster sorting of items. In some embodiments, $L_2$ can be between 10 percent and 50 percent of the total length L. In some embodiments, $L_2$ can be between 20 percent and 40 percent of the total length L. In some embodiments, $L_2$ can be between 25 percent and 35 percent of the total length L. In some embodiments, $L_2$ can be approximately one third the total length L. Other ratios are possible.

In some embodiments, the trailing door 341 can be omitted entirely and the leading door 342 can comprise the entire length L or vice versa.

The embodiment of the sorter 330 described in reference to FIGS. 3B-3D can be incorporated into any of the sorting systems or devices described herein. However, other types of sorters, including sorters with only a single door, doors of equal lengths, doors which open around an axis parallel to the direction of travel of the cells, tilting sorters, or any other type of sorters can also be used. In some embodiments, the doors with different lengths described in reference to the sorter 330 can be included in only some of the cells of the sorter.

In some embodiments, the sorter 330 includes an encoder 399 that accurately monitors the position of the plurality of cells A-D carried by the sorter. The encoder 399 allows the sorting system to locate the position of each of the cells A-D relative to the other components of the system. For example, the encoder 399 allows the sorting system to determine when a particular cell of the plurality of cells A-D is positioned adjacent to an induction platform or above a particular chute or bin.

In some embodiments, each of the cells A-D includes a sensor 398 to determine whether the cell A-C is carrying an item or is empty. The sensor 398 can be a pressure sensor that determines whether an item is present by measuring the weight of the cell. In some embodiments, the sensor 398 can be an infrared beam emitter and detector that determines whether an item is present depending on whether the beam is broken by an item or not. Other types of suitable sensors, such as photoelectric sensors and the like, are known in the art and can be implemented by a person of ordinary skill in the art without departing from the scope of this disclosure.

Figure 3E:
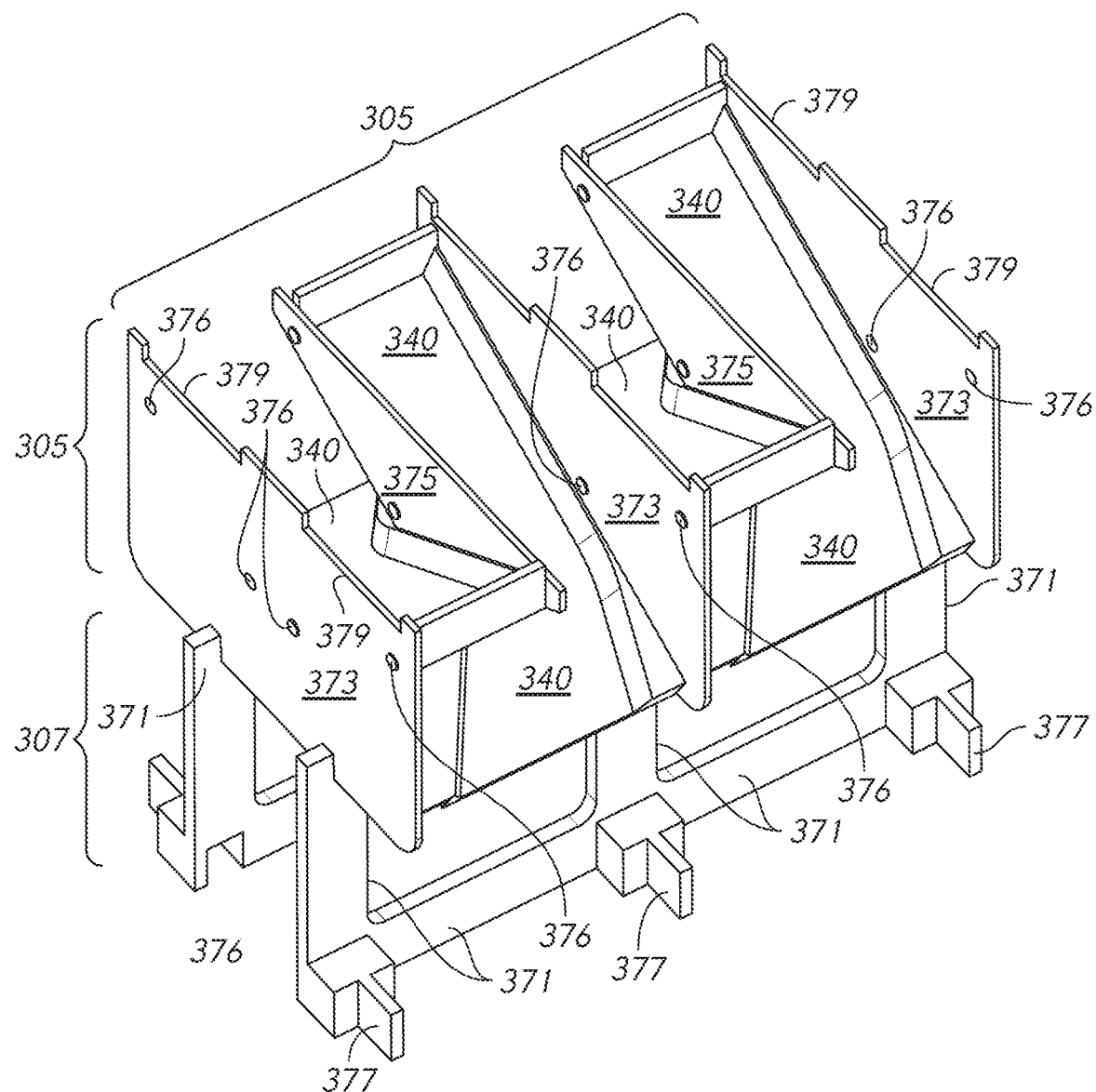
FIG. 3E is a perspective view of the high throughput sorting device of FIG. 3A with the two sorter sections removed.

In the illustrated embodiment of the sorting device 300, a chute system 305 is located below the sorter section 303, as shown in FIG. 3A and FIG. 3E (which shows the sorting device 300 with the sorter section 303 removed). The chute system 305 includes four chutes 340 for guiding items dropped by the cells 331a-d onto the chutes 340 into one of four bins 390 (not shown in FIG. 3G). An embodiment, of the chute system 303 will now be described in greater detail with reference to FIGS. 3E-3I.

In the illustrated embodiment, a base section 307 supports the chute system 305 and the sorter section 303. The base section 307 can include one or more legs 371 and one or more side supports 373. The legs 371 and side supports 373 are configured to support the various chutes 340 and sorters 330a, 330b in a proper orientation to enable sorting. In the illustrated embodiment, the legs 371 extend up from the ground and support the side supports 373, which in turn support the chutes 340 and the sorters 330a, 330b. The legs 371 can also include feet 377 that provide stability for the sorting device 300. In some embodiments, the feet 377 can extend parallel to the floor to provide guides for correctly aligning the bins 390 relative to the chutes 340 as shown in FIG. 3A. The legs 371 also raise the chute system 305 above the floor, to create a space below the chute system for the bins 390. Only a single bin 390 is illustrated in FIG. 3A; however, in general, a bin 390 can be positioned at the end of each of the chutes 340. In the illustrated embodiment, which includes four chutes 340, the sorting device 300 will typically include four bins.

FIG. 3E shows the high throughput sorting device 300 of FIG. 3A with the sorter section 303 removed to better illustrate various features of the base section 307 and the arrangement of the chute system 305. The base includes the legs 371 and feet 377 that support the one or more side supports 373 as described above. As shown in FIG. 3A, the base section 307 can also include intermediate supports 375 positioned between each pair of adjacent chutes 340. The side supports 373 and intermediate supports 375 can be rigid, substantially planar structures configured in size and shape to support the chutes 340 and the sorters 330a, 330b. For example, in some embodiments, the side supports 373 and intermediate supports 375 include holes 376 formed therein and configured to receive corresponding pins 346 (shown in FIG. 3G) on the chutes 340. In some embodiments, the chutes 340 are mechanically or adhesively attached to the side supports 373 and intermediate supports 375. When attached, the chutes 340, side supports 373 and intermediate supports 375 form a rigid and stable structure with the chutes 340 arranged in a fixed position. The particular arrangement of chutes 340 is shown with the base section 307 and sorters 330a and 330b removed in FIG. 3F. The side supports 373 and intermediate supports 375 can additionally be configured to ensure that an item dropped onto a particular chute remains on the specified chute by providing a wall between adjacent chutes. The side supports 373 and intermediate supports 375 can include features 379, for example, cutouts or protrusions, for supporting the sorters 330a and 330b.

Figure 3F:
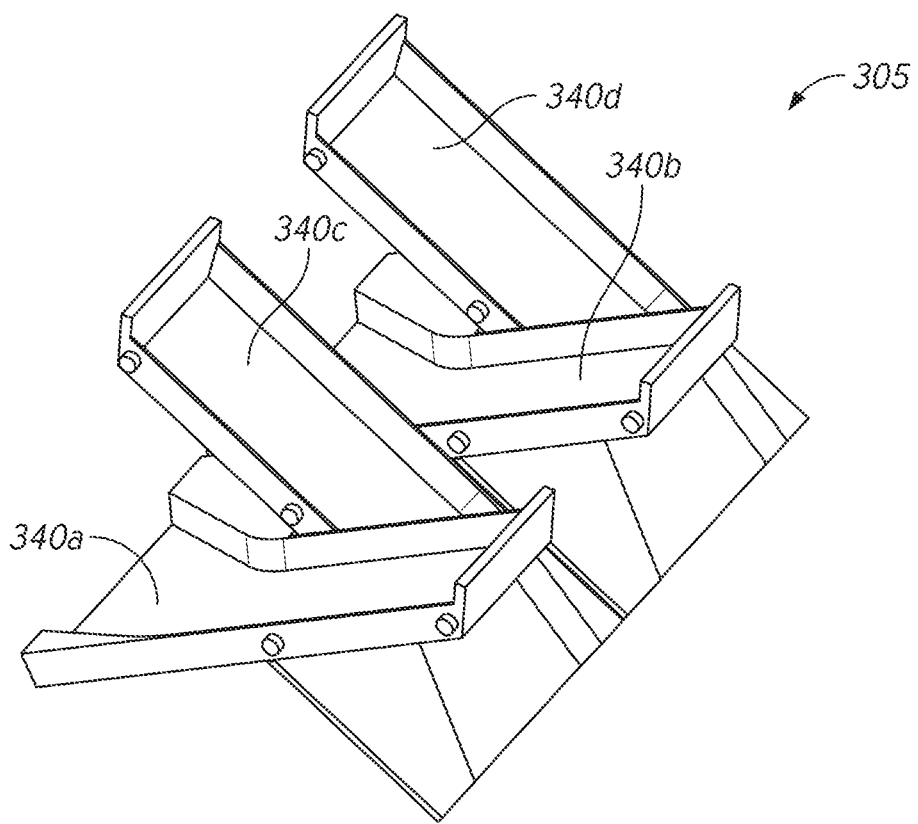
FIG. 3F is a perspective view of the chute system of the high throughput sorting device of FIG. 3A.
Figure 3G:
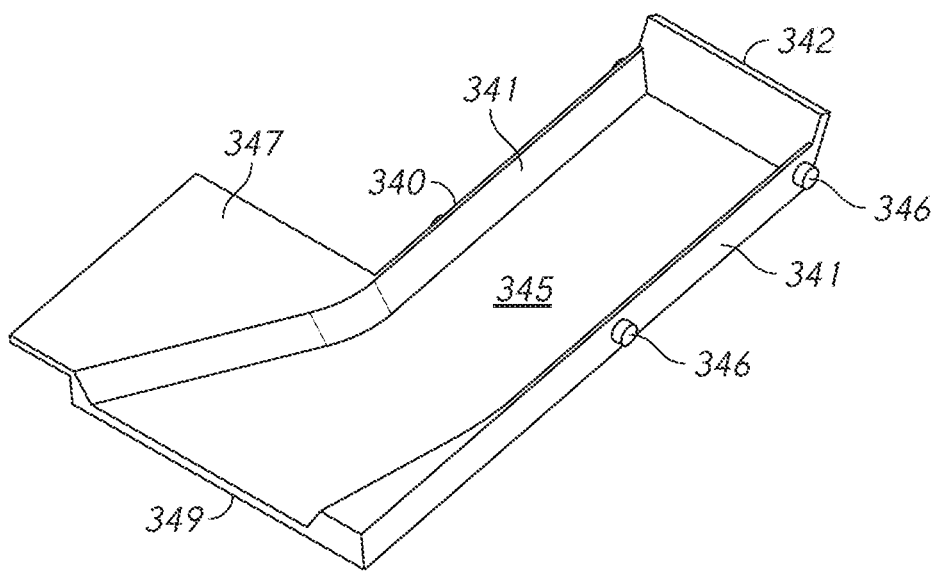
FIG. 3G is a perspective view of an embodiment a single chute of the high throughput sorting device of FIG. 3A.
Figure 3H:
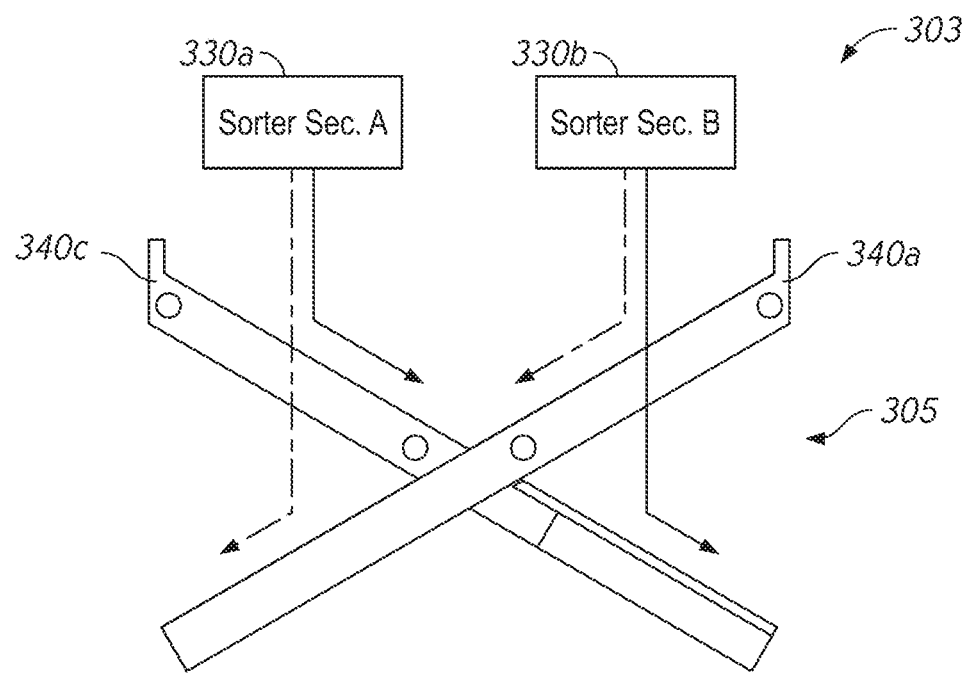
FIG. 3H is an end view of the chute system of FIG. 3F.

FIG. 3F shows the chute system 305 of the high throughput sorting device 300 of FIG. 3A. In the illustrated embodiment, the chute system 305 includes four chutes 340a-d. In the illustrated embodiment, each chute 340a-d is configured at an inclined angle, so that any item placed on the chute will slide down the incline thereof. In the illustrated embodiment, each successive chute is inclined to guide an item placed thereon in a different direction than its neighboring chutes. For example, in FIG. 3F, chutes 340a and 340b are inclined so as to slide items generally to the left side of the figure, while chutes 340c and 340d are inclined so as to slide items generally to the right side of the figure. An end view of this arrangement is shown in FIG. 3H. This arrangement is provided for example only, and other arrangements are possible. For example, all the chutes can be inclined to slide items in the same direction.

FIG. 3G shows an embodiment a single chute 340 of the high throughput sorting device 300 of FIG. 3A. The chute 340 in FIG. 3G can be representative of any of the chutes 340a-d of the sorting device 300. The chute 340 can include a generally planar slide portion 345 configured to slide items from the top 342 of the chute 340 to the bottom 349. The slide portion 345 need not be planar; in some embodiments, the slide portion 345 can be substantially convex or concave, or any other suitable shape. The slide portion 345 can be coated with or formed from a material having a low coefficient of friction, such that items placed thereon easily slide along the slide portion 345. For example, the slide portion 345 can be made of a smooth metal or plastic, allowing items easily to slide thereon. In some embodiments, the slide portion 345 is coated with a low coefficient of friction coating. In some embodiments, the slide portion 345 can comprises a plurality of rollers. In some embodiments, the slide portion 345 can be a powered conveyor belt.

In some embodiments, the top 342 and sides 341 of the chute 340 can include walls configured to contain items placed thereon. For example, the walls can prevent an item dropped onto the chute 340 from bouncing off the sliding portion 340 and onto an adjacent chute 340. In some embodiments, the end 349 of the chute 340 is flared, as shown in FIG. 3G. This can allow the chute 340 to align with a bin 390 (shown in FIG. 3A) that has a width that is wider than at least a portion of the sliding portion 345. The chute 340 can also include a flange 347 configured to extend below an adjacent chute 340. The flange 347 can close any gaps between adjacent chutes 340 and provide further structural support for the sorting device 300.

FIG. 3H shows an end view of the chute system 305 of FIG. 3F and the relationship thereof to the sorters 330a, 330b. The end view of the chute system 305 can be substantially X-shaped as illustrated. The sorters 330a and 330b are positioned above the chutes 340. In the orientation shown in FIG. 3H, the sorters 330a and 330b are configured to move cells into and out of the page and the chute 340a is positioned in front of the chute 340a. Either sorter 330a or 330b can drop items onto either chute 340a or 340c depending on the location of the cell relative to the chutes. The various paths are illustrated with solid and dashed arrows. A dashed arrow illustrates a drop position farther out of the page, in other words over the chute 340a, and a solid arrow illustrates a drop position further into the page, in other words over the chute 340c.

Figure 3I:
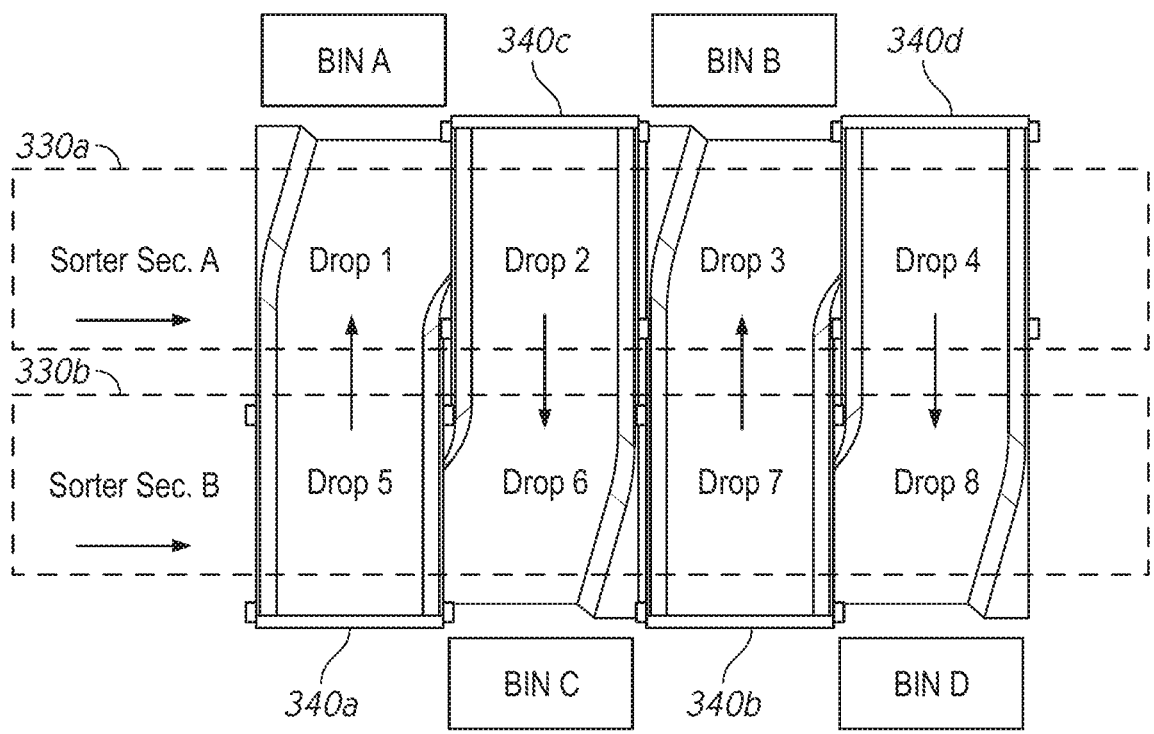
FIG. 3I is a top view of the chute system of FIG. 3I and illustrates the various drop points on the two sorter sections for routing items to any of the shared bins.

FIG. 3I shows a top view of the chute system 305 of FIG. 3I and illustrates the various drop points on the two parallel sorters 330a and 330b for routing items to any of the shared bins A-D. The drop points are summarized in Table 1.

TABLE 1

|  | Bin A | Bin B | Bin C | Bin D |
| --- | --- | --- | --- | --- |
| Sorter A | Drop 1 | Drop 2 | Drop 3 | Drop 4 |
| Sorter B | Drop 5 | Drop 6 | Drop 7 | Drop 8 |

Notably, items from either sorter A or sorter B can be sorted into any of bins A-D as a drop point for any bin is included on each sorter. This is accomplished because, as shown in FIG. 3I, each of the chutes 340a-d extend below a portion of each sorter 330a and 330b.

The embodiment of the sorting device 300 shown in FIGS. 3A-3I, provides one example of a device for sorting items from two sorters into a plurality of shared bins. A person of skill in the art, however, will understand that the principles discussed in reference to the sorting device 300 can be applied to other sorting devices. For example, the sorting device can be expanded to work with more than two sorters. For example, a sorting device can be configured with chutes extending below three sorters to feed items on any of the three sorters into any of a set of shared bins. The arrangement of the chutes can also be modified without departing from the scope of this disclosure. For example, while the sorting device 300 includes bins on opposite sides of the device, it could be modified so that all of the bins are located on a single side of the device. This could be accomplished, for example, by arranging the chutes so that they all slope to the same side. Moreover, while the sorting device 300 has been described as having four chutes and accommodating a sorter length of four cells, this need not always be the case. The sorting device can include greater or fewer than four chutes and can accommodated a length of sorter longer of shorter than four cells. Factors relating to the overall size, for example, height and width, can also easily modified depending on the particular sorting application. Similarly the angle of inclination of the chutes can also be modified.

Figure 4A:
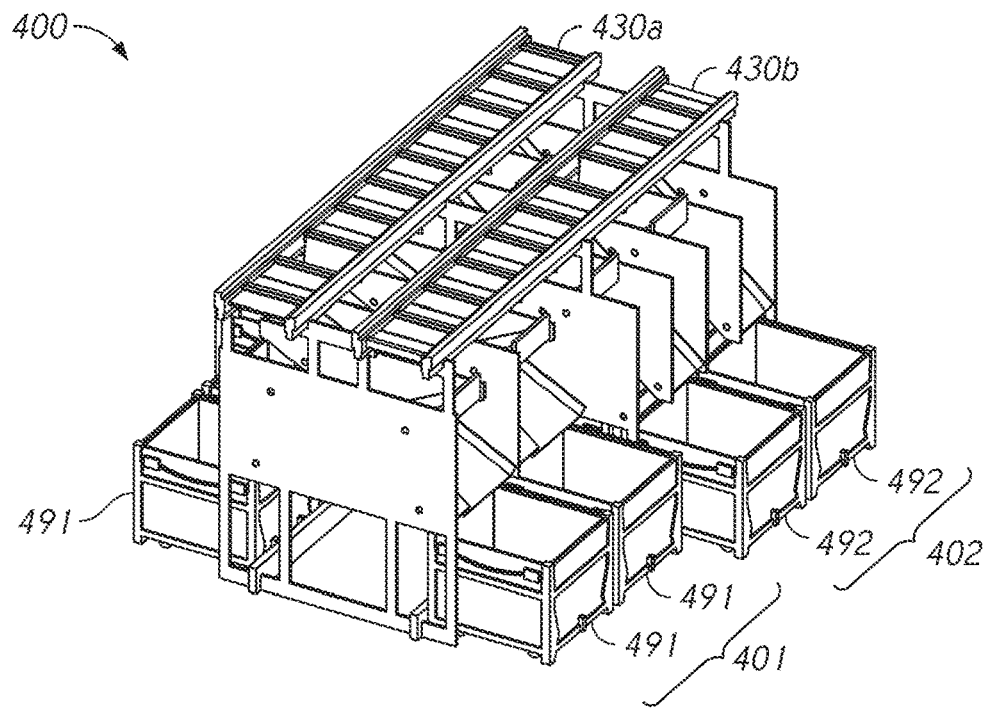
FIG. 4A is a perspective view of an embodiment of a sorting device for use with two sorter sections including a shared portion for routing items to a set of shared bins and a dedicated portion for routing items to a set of dedicated bins. Each of the shared bins is reachable from either of the two sorter sections, while each of the dedicated bins is reachable from only one of the two sorter sections.
Figure 4B:
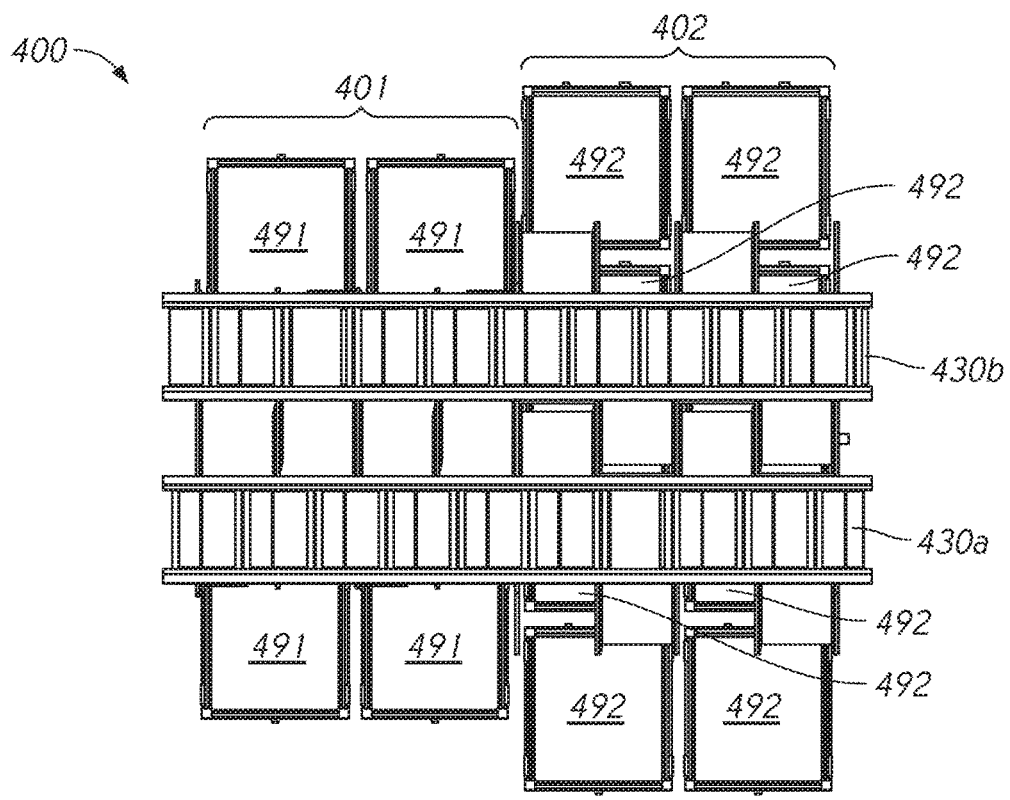
FIG. 4B is a top view of the sorting device of FIG. 4A.

FIG. 4A is an embodiment of a sorting device 400 for use with two parallel sorters 430a, 430b including a shared portion 401 for routing items to a set of shared bins 491 and a dedicated portion 402 for routing items to a set of dedicated bins 492. Each of the shared bins 491 is reachable from either of the two sorters 430a and 430b, while each of the dedicated bins 492 is reachable from only one of the two sorters 430a or 430b. FIG. 4B is a top view of the sorting device of FIG. 4A.

The shared portion 401 can be substantially similar to the sorting device 300 discussed above in reference to FIGS. 3A-3I. The dedicated portion 402 can be similarly constructed to the sorting device 300, in that it can comprise a base section, configured to support a chute system and two parallel sorters, but it also includes a greater number of chutes and bins as will be discussed below in reference to FIGS. 5A-5B. In some embodiments, the dedicated portion 402 can be configured as a standalone sorting device, separate from the shared portion 401.

Figure 5A:
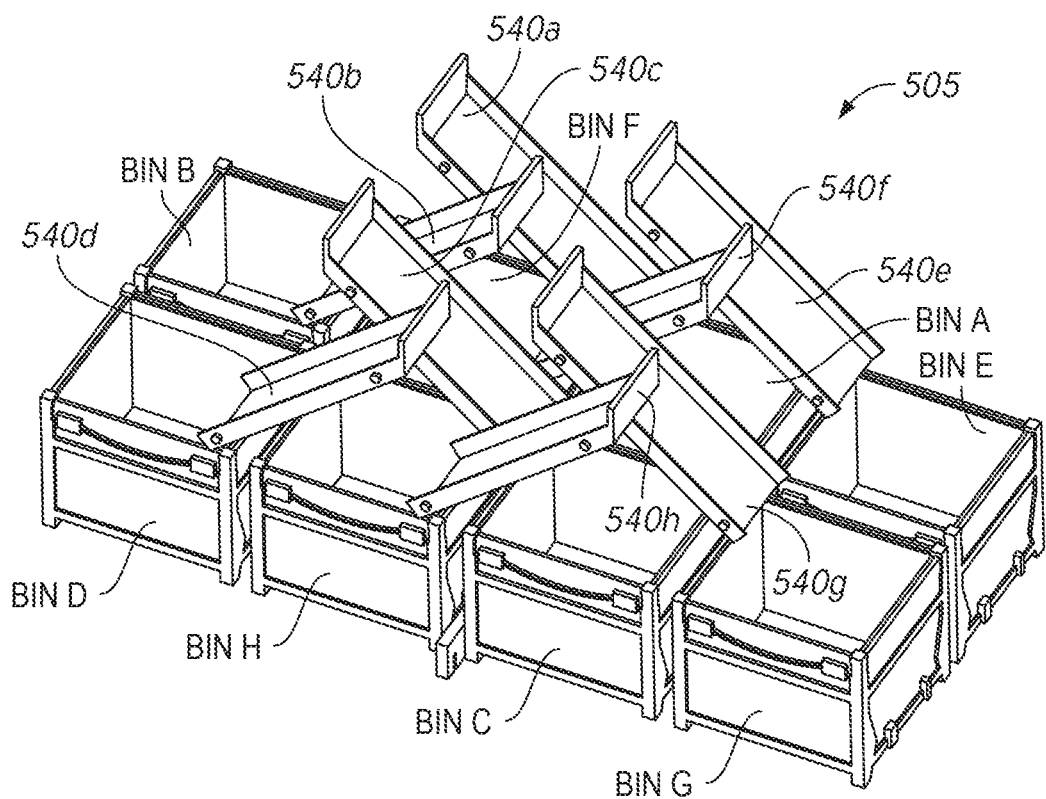
FIG. 5A is a perspective view of an embodiment of the chute system of the dedicated portion of the sorting device of FIG. 4A and the set of dedicated bins.

FIG. 5A is an embodiment of a chute system 505 for use in the dedicated portion 402 of the sorting device 400 of FIG. 4A shown with a set of dedicated bins A-H. The chute system 505 includes eight chutes 540a-h, each chute configured to lead to a single bin A-H. Each of the chutes 540a-can be configured to be substantially similar to the chute 340 shown in FIG. 3G.

Figure 5B:
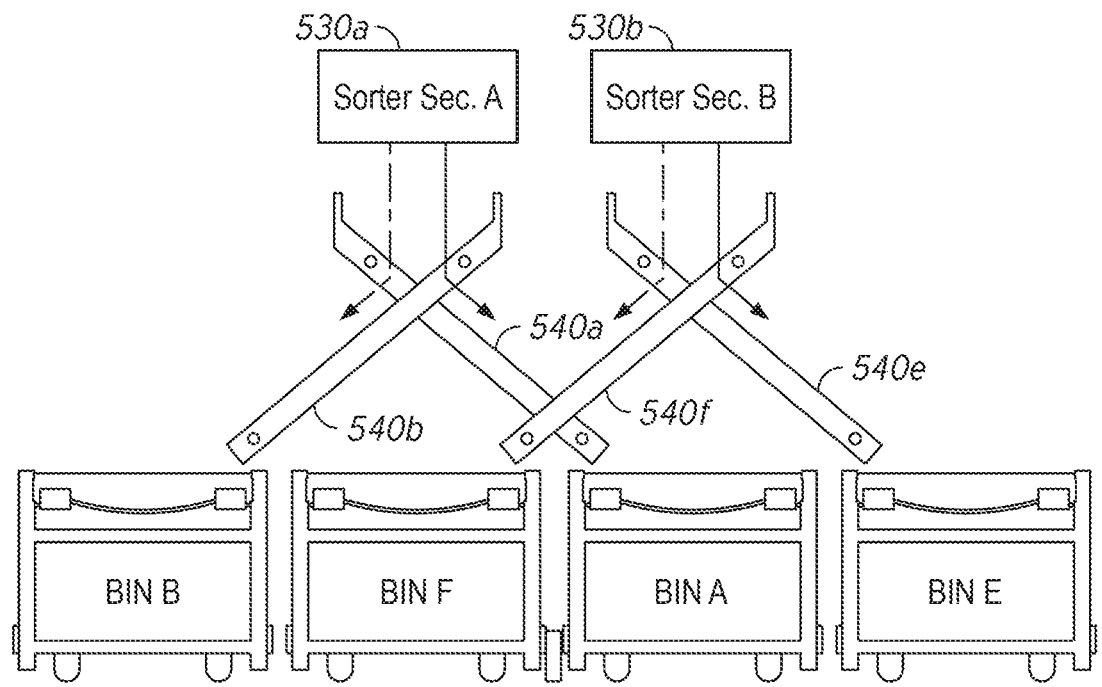
FIG. 5B is an end view of the chute system and the set of dedicated bins of FIG. 5A.

FIG. 5B shows an end view of the chute system 505 and the set of dedicated bins of FIG. 5A. Only the chutes 540a, 540b, 540e, 540f, associated with a single row of bins A, B, E, F, are discussed in reference to FIG. 5B, although the arrangement is repeated for the other row of chutes and bins. The end view of the chute system 505 can include two substantially X-shaped arrangements of chutes. A sorter 530a or 530b is positioned above each of the X-shaped arrangements of chutes. In FIG. 5B, the sorters 530a and 530b are configured to move cells into and out of the page, and the chutes 540a and 540e are positioned behind the chutes 540b and 540f, respectively. The sorter 530a can drop items only onto chutes 540a and 540b to reach bins A and B. The sorter 530b can drop items only onto the chutes 540e and 540f to reach bins E and F. In the figure, a dashed arrow illustrates a drop position farther out of the page, in other words, for example, over the chute 540b or 540f, and a solid arrow illustrates a drop position further into the page, in other words, for example, over the chute 540a or 540e.

Figure 5C:
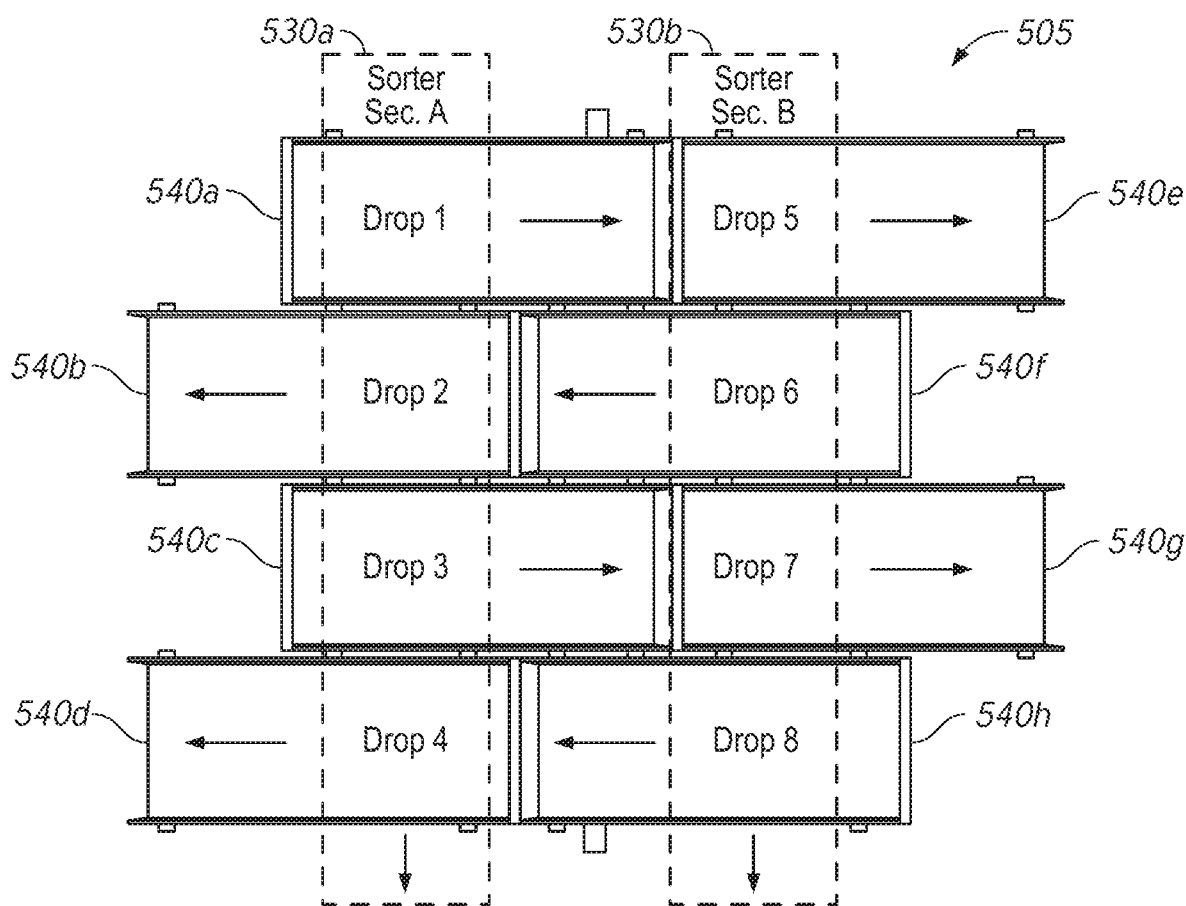
FIG. 5C is a top view of the chute system of FIG. 5A and illustrates the drop points for each of the two sorters for routing items to each of the dedicated bins.
Figure 5D:
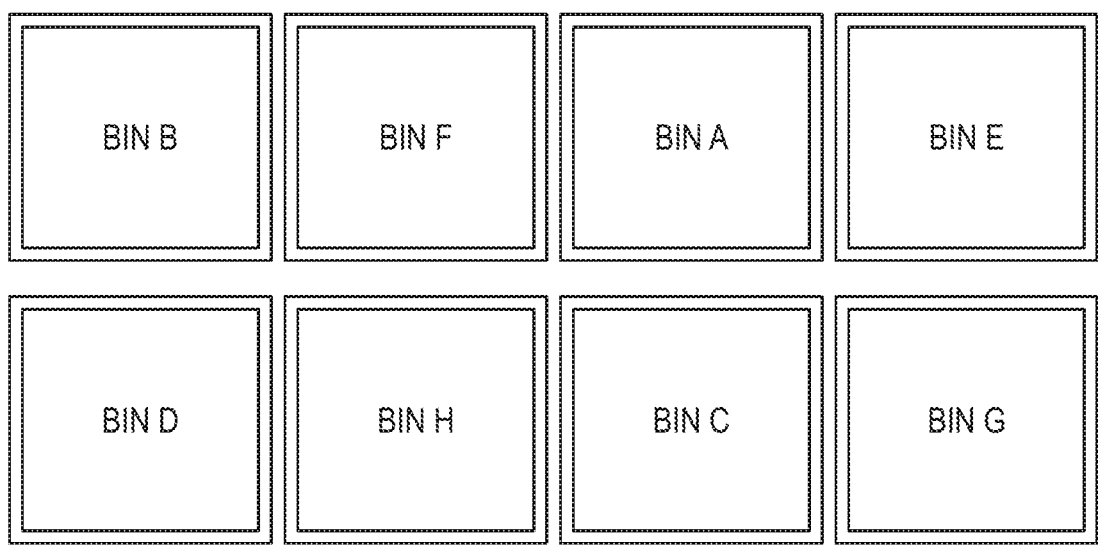
FIG. 5D is an example layout of dedicated bins for use with the chute system of FIG. 5A.

FIG. 5C shows a top view of the chute system 505 of FIG. 5A and illustrates the drop points for each of the two sorters 530a and 530b for routing items to each of the dedicated bins 540a-540h. FIG. 5D shows the layout of dedicated bins A-H for use with the chute system 505 of FIG. 5A. It should be understood that the arrangement of bins shown in FIG. 5D is oriented to fit below the chute system shown in FIG. 5C. The drop points are summarized in Table 2.

TABLE 2

|  | Bin A | Bin B | Bin C | Bin D | Bin E | Bin F | Bin G | Bin H |
|---|---|---|---|---|---|---|---|---|
| Sorter A | Drop 1 | Drop 2 | Drop 3 | Drop 4 | — | — | — | — |
| Sorter B | — | — | — | — | Drop 5 | Drop 6 | Drop 7 | Drop 8 |

Notably, items from sorter 530a can only reach bins A-D and items from sorter 540b only reach bins E-H. Accordingly, the system of chutes 505 is useable with a set of dedicated bins.

The sorting device 300 and the sorting device 400 can be used in sorting systems that include parallel sorters or sorter sections. Embodiments of such sorting systems will now be described in reference to FIGS. 6 and 7, which show the systems schematically, similar to FIG. 1, above.

Figure 6:
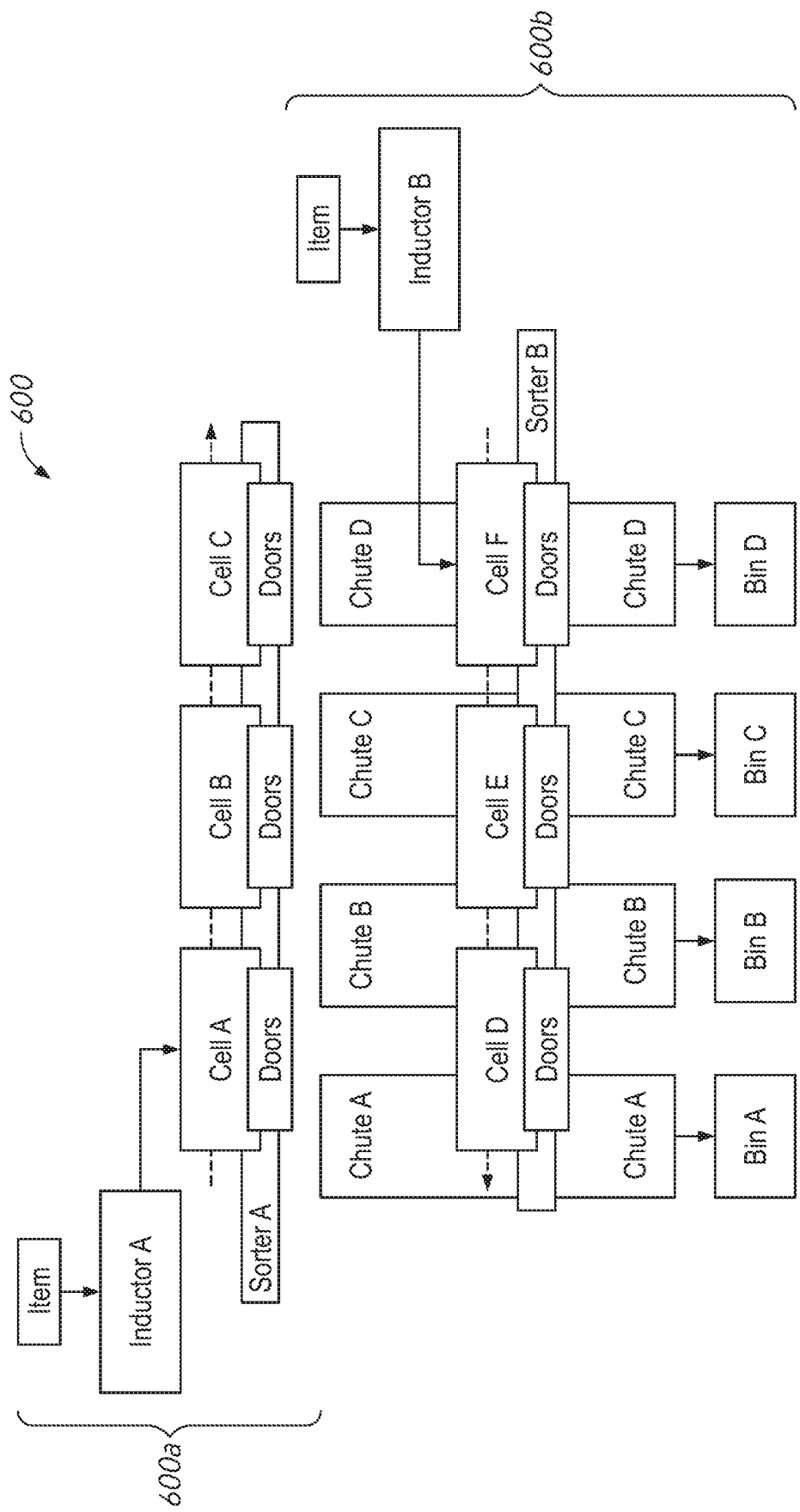
FIG. 6 is a block diagram of an embodiment of a sorting system that includes two sorters, each with its own inductor, feeding a set of shared bins.

FIG. 6 is a block diagram of an embodiment of a sorting system 600 that includes two sorters A and B, each with its own inductor A and B, respectively, for feeding a set of shared bins A-D. In the sorting system 600, the bins A-D are considered to be shared bins because each of the bins A-D is accessible from either the sorter A or the sorter B.

The sorting system 600 includes a first portion 600a and a second portion 600b. The first portion 600A includes an inductor A, a sorter A with cells A-C and portions of chutes A-D. In general each of these elements, other than chutes A-D, can be substantially similar to corresponding elements in the sorting system 100 of FIG. 1. The cells A-C on the sorter A can deposit items onto the portions of chutes A-C that correspond with the first portion 600a. For example, in some embodiments, portions of the chutes A-C are positioned below the sorter A. The second portion 600b includes an inductor B, a sorter B with cells D-F, and portions of chutes A-D. The elements of the second portion 600b, other than the chutes A-D, can be substantially similar to corresponding elements of the sorting system 100 described above. The cells D-F on the sorter B can deposit items onto the portions of the chutes A-D that correspond with the second portion 600b. For example, in some embodiments, portions of the chutes A-C are positioned below the sorter B. In some embodiments, portions of the sorter A and the sorter B are parallel to facilitate placement of the chutes A-D below both the sorter A and the sorter B.

The chutes A-D in the sorting system 600 can be substantially similar to the chutes A-D of the sorting system 100 of FIG. 1, except that they are configured to extend below both the sorters A and B. Accordingly, an item can be dropped onto chute A by either the sorter A or the sorter B to guide the item to bin A. In other words, the bin A is a shared bin that is shared between both the first portion 600a and the second portion 600b of the sorting system 600. In some embodiments, the sorting system 600 can use the sorting device 300 of FIGS. 3A through 3I to sort items into the shared bins.

The theoretical throughput of each of the first portion 600a and the second portion 600b is one (1), because for each revolution of the sorter A or the sorter B, any single cell A-F can deposit only a single item into any of the bins A-D. The sorting system 600, however, can process twice as many items per unit time than the sorting system 100 (of FIG. 1) because the capacity of sorting system 600 is twice that of sorting system 100: sorting system 600 has six cells A-F, while the sorting system 100 has only three cells A-C. Additionally, because the sorting system 600 has two inductors A and B it is able to load the six cells A-F twice as fast as the single inductor 110 of the sorting system 100 is able to load its three cells A-C. For this reason, merely increasing the capacity of the sorting system 100 will not create a system capable of sorting as quickly as the sorting system 600, which has two loops operating in parallel.

In an alternative embodiment of the sorting system 600, the sorter A and the sorter B represent only sections of a single combined sorter. That is, the cells A-F are all part of a single sorter or conveyor which includes the sorter A section and the sorter B section, and thus the cells A-F travel around one unitary loop. In this embodiment, each of the six cells A-F can be loaded by both the inductor A and the inductor B. Moreover, each of the six cells A-F passes each of the chutes A-D in between each inductor A and B. Thus, each of the six cells A-F will be empty each time it reaches the next inductor. In this embodiment, the theoretical throughput of the sorting system 600 is two (2) because each cell can deposit two items per every revolution of the combined sorter. In other words, the cell A will be loaded by the inductor A and will deposit its item onto one the chutes A-D by the time it reaches inductor B; the cell A will then be reloaded at the inductor B and will deposit this second item onto one of the chutes A-D by the time it returns again to inductor A.

Figure 7:
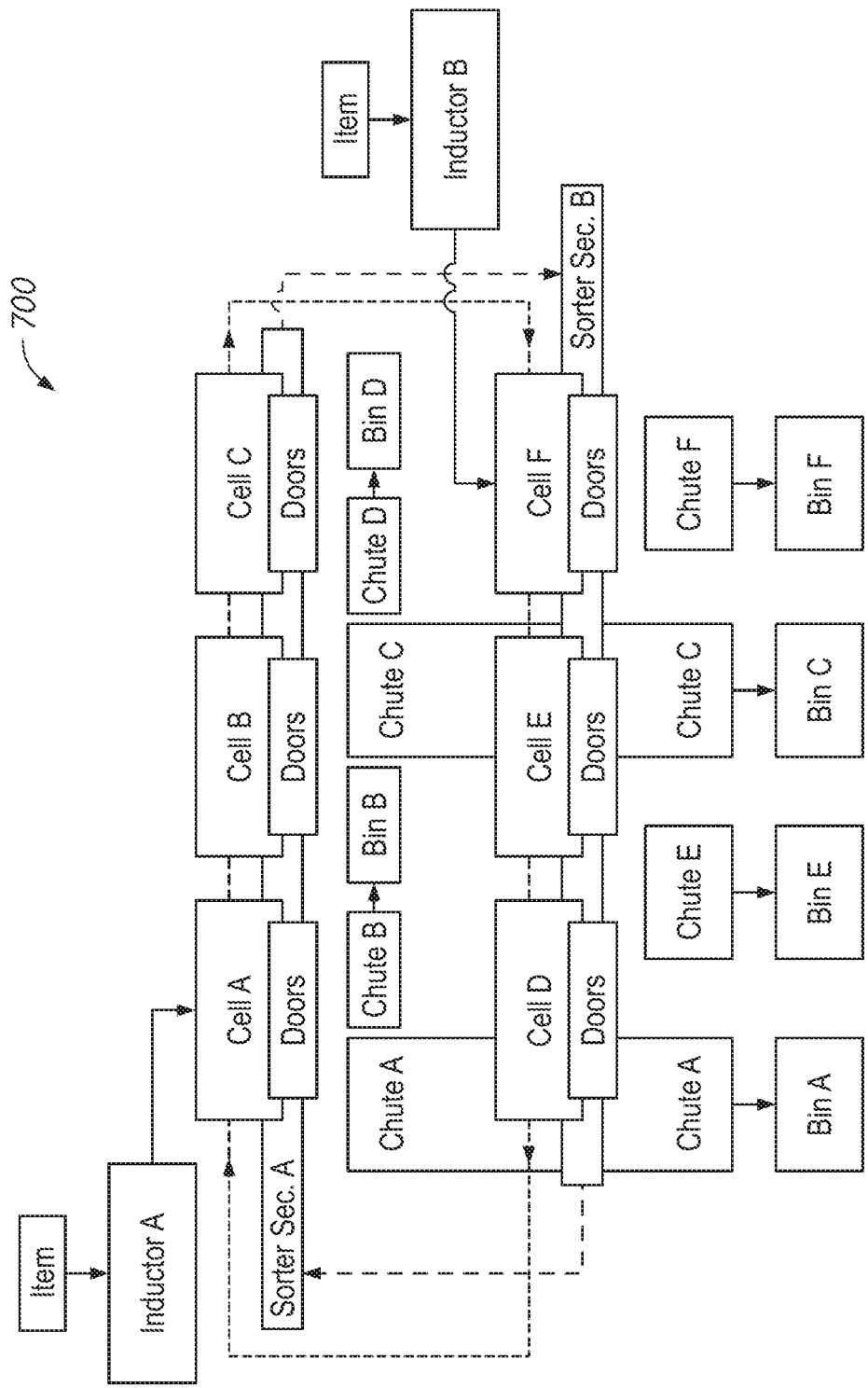
FIG. 7 is a block diagram of an embodiment of a high throughput sorting system including two inductors and a looped sorter feeding a plurality of dedicated bins and a plurality of shared bins.

FIG. 7 is a block diagram of an embodiment of a high throughput sorting system 700 including two inductors A and B and a looped sorter, with a first sorter section A and a second sorter section B, feeding a plurality of shared bins A and C and a plurality of dedicated bins B, D, E, and F. The terms shared bins and dedicated are used as defined above, with shared bins accessible from either loop and dedicated bins accessible each from only a single loop. In general, the elements of the sorting system 700 are substantially similar to the elements of the sorting systems described above. However, in the sorting system 700, the elements are arranged to include some chutes A and C leading to shared bins A and C, and some dedicated chutes B, D, E, and F leading to dedicated bins B, D, E, and F. In other words, as the six cells A-F travel around the sorter, the cells pass the chutes A and C twice, once during sorter section A and again during sorter section B. In contrast, the cells pass the chutes B, D, E, and F only once per revolution: the chutes B and D only during the sorter section A and the chutes E and F only during the sorter section B.

Assuming the items arriving at the inductors A and B have an even distribution, that is, that the items are randomly distributed so that the probability that any particular item will be distributed into any particular bin is the same, the theoretical throughput of the sorting system 700 is 4/3. This is because, beginning with the inductor A, a loaded cell passes four (A, B, C, D) of the six total bins A-F before reaching inductor B. Thus, assuming an even distribution of items, for a particular cell, the probability that an item will be deposited during the sorter section A is four out of six, or 2/3. During the sorter section B, the cell again passes four (A, C, E, F) bins of the A-F bins. The probability that an item is deposited during the sorter section B is again 2/3. Thus, for the entire sorter, including the sorter sections A and B, each cell will deposit, on average, 4/3 items per revolution (or because 1/3 of an item is nonsensical, each cell A-F of the sorting system 700 is capable of depositing 12 items per 9 revolutions).

In one embodiment, the sorting system 700 can be further optimized by controlling how items are routed to the inductor A and the inductor B. For example, if items are routed to inductor A such that the probability that items will be deposited into the bins A-D during sorter section A is increased, the overall theoretical throughput of the system can be increased.

A person of ordinary skill in the art will appreciate that the elements and features of the sorting systems 100, 600, and 700 described above can be combined and/or modified for adaptation to a particular sorting need. For example, it will be understood that the number of elements in any of the sorting systems described above can be increased or decreased without departing from the scope of this disclosure. For example, the sorting system 400 could be modified to include 100 cells, with 50 dedicated bins and 50 shared bins.

Figure 8:
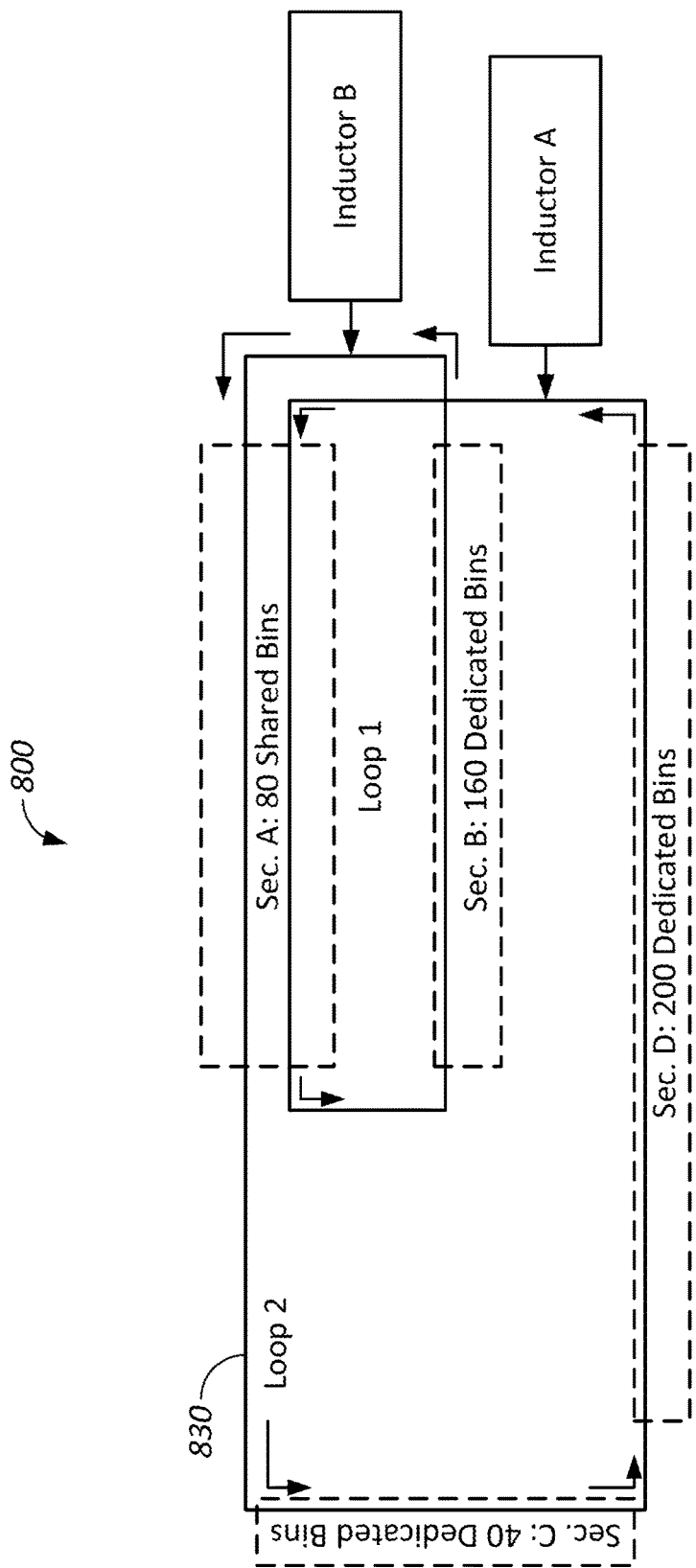
FIG. 8 is schematic diagram showing a layout of a high throughput sorter system including a looped sorter and two inductors feeding a set of shared and a set of dedicated bins.

FIG. 8 is schematic diagram showing a layout of a high throughput sorter system 800 including a looped sorter 830 and two inductors A and B feeding a set of shared bins and a set of dedicated bins. In the embodiment shown, 80 shared bins are located in sorter section A. A first set of 160 dedicated bins is shown in sorter section B. A third set of 40 dedicated bins is shown in sorter section C. And a fourth set of 200 dedicated bins is shown in sorter section D. The sorting system 800 therefore includes 480 bins total. Notably, the sorter section A includes two parallel sorter sections, for example as shown in FIG. 3A. The sorter sections B, C, and D only include a single sorter section, for example as described in reference to FIG. 1.

The sorter 830 is arranged as a double loop. That is, the sorter 830 is arranged with two loops (loop 1 and loop 2) so that each loop passes over the shared bins in sorter section A; however, a person of skill in the art will appreciate that the sorter 830 is continuous along its length. That is, loop 1 feeds directly into loop 2, and vice versa. In the figure, loop 1 is the smaller inner loop beginning at inductor A. Loop 1 includes the sorter section A and the sorter section B. Loop 2 is the larger outer loop beginning at inductor B. Loop 2 includes the sorter section A, the sorter section C, and the sorter section D. The inductor A is configured to fill any empty cells on the sorter 830 before the cells enter loop 1. Similarly, the inductor B is configured to fill any empty cells on the sorter 830 before the cells enter loop 2.

The sorter section A includes shared bins that are accessible from both loop 1 and loop 2. In some embodiments, the sorting system 800 can employ the sorting device 300 described above in reference to FIGS. 3A-3I at the sorter section A to allow for feeding of the shared bins by both loop 1 and loop 2. The sorter sections B-D include dedicated bins. Notably, in some embodiments of the sorting system 800 using the sorting device 300 as described above, the length of the sorter 830 in area A to accommodate the 80 shared bins is approximately equal to the length of the sorter 830 in area B that accommodates the 160 dedicated bins.

The theoretical throughput of the sorting system 800 shown in FIG. 8 is calculated to be 7/6. Beginning with all cells loaded by inductor A, loop 1 passes the 80 shared bins of section A and the 160 dedicated bins of section B for a total of 240 bins out of the 480 bins on the sorter. Accordingly, assuming even distribution, approximately 1/2 the cells will on average be unloaded by the time they reach inductor B. The inductor B reloads all empty cells and during loop 2 the cells pass the 80 shared bins of section A and the 240 dedicated bins of sections C and D for a total of 320 bins out of the 480 bins on the sorter. Thus, again assuming even distribution, on average 2/3 of the cells should be unloaded during loop 2. The total theoretical throughput of the sorting system 800 is the sum of the 1/2 from loop 1 and the 2/3 from loop 2, for a total theoretical throughput of 7/6.

It will be appreciated that the total number of dedicated and shared bins, their layout and organization, and the number of inductors can be varied depending on the particular sorting application, size constraints of the processing facility, or availability of sorting equipment. Schematics illustrating several example sorting systems are shown in FIGS. 9-16. These are provided by way of example only, and are not intended to be limiting. Further, a person of ordinary skill in the art will understand that the attached schematics do not form an exhausted list and other layouts for sorting systems are possible and within the scope of this disclosure.

Figure 9:
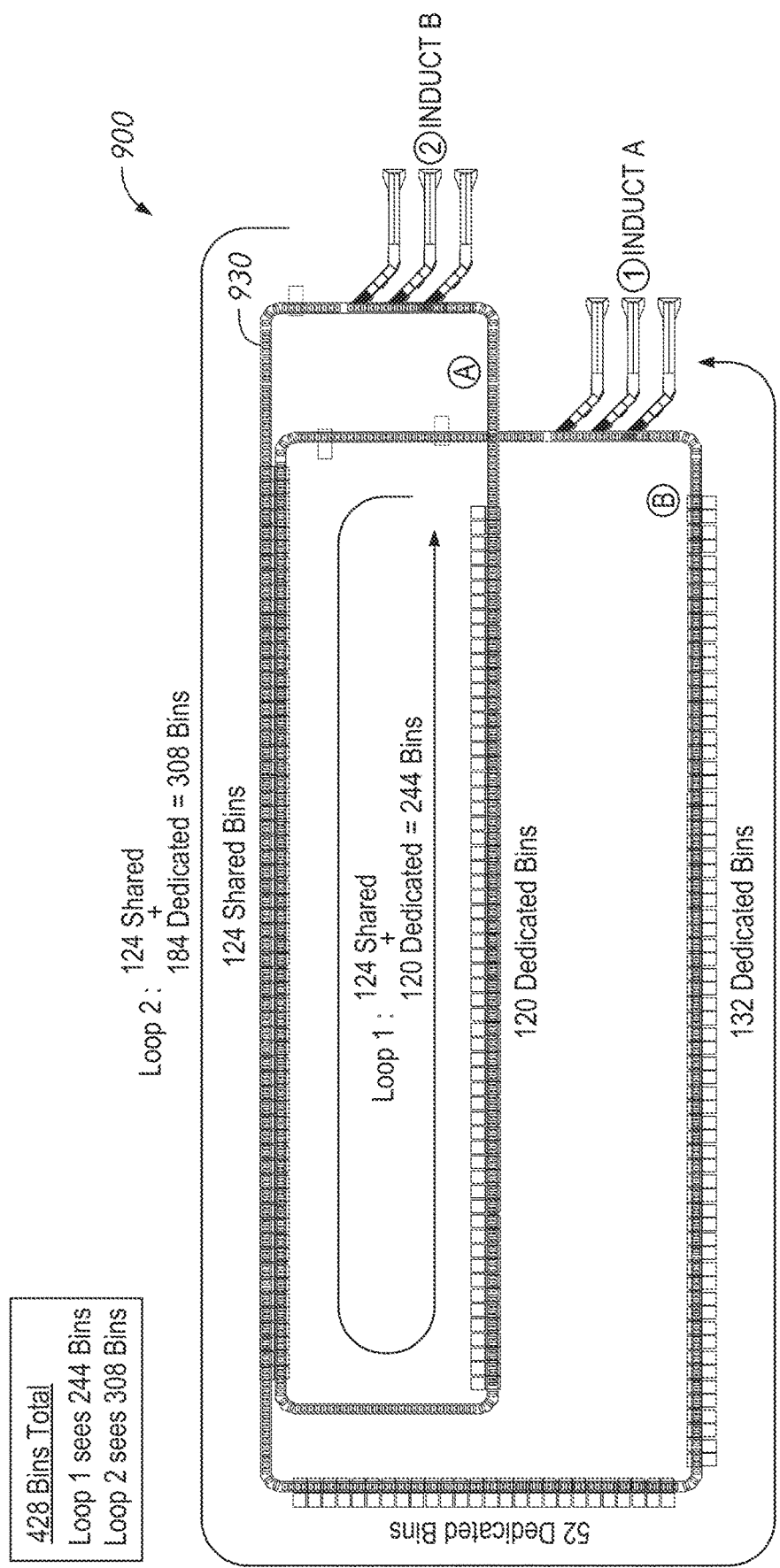
FIG. 9 is a detailed top view of an embodiment of a sorting system that includes a first loop, a second loop, a set of shared bins, and a set of dedicated bins.

FIG. 9 depicts a detailed top view of an example of a sorting system 900 that includes a sorter 930 having a first loop with 124 shared bins and 120 dedicated bins and a second loop with 124 shared bins and 184 dedicated bins. The 124 shared bins are accessible by both loop 1 and loop 2. The system includes a first inductor A which loads cells on the sorter 930 prior to loop 1 and a second inductor B which loads cells on the sorter 930 prior to loop 2. The sorter 930 is configured as a continuous double loop. During loop 1, 244 bins of the 428 bins will be unloaded, and during loop 2, 308 bins of the 428 bins will be unloaded. Thus, the theoretical throughput for the system 900 is 552/428, or approximately 1.29.

Figure 10:
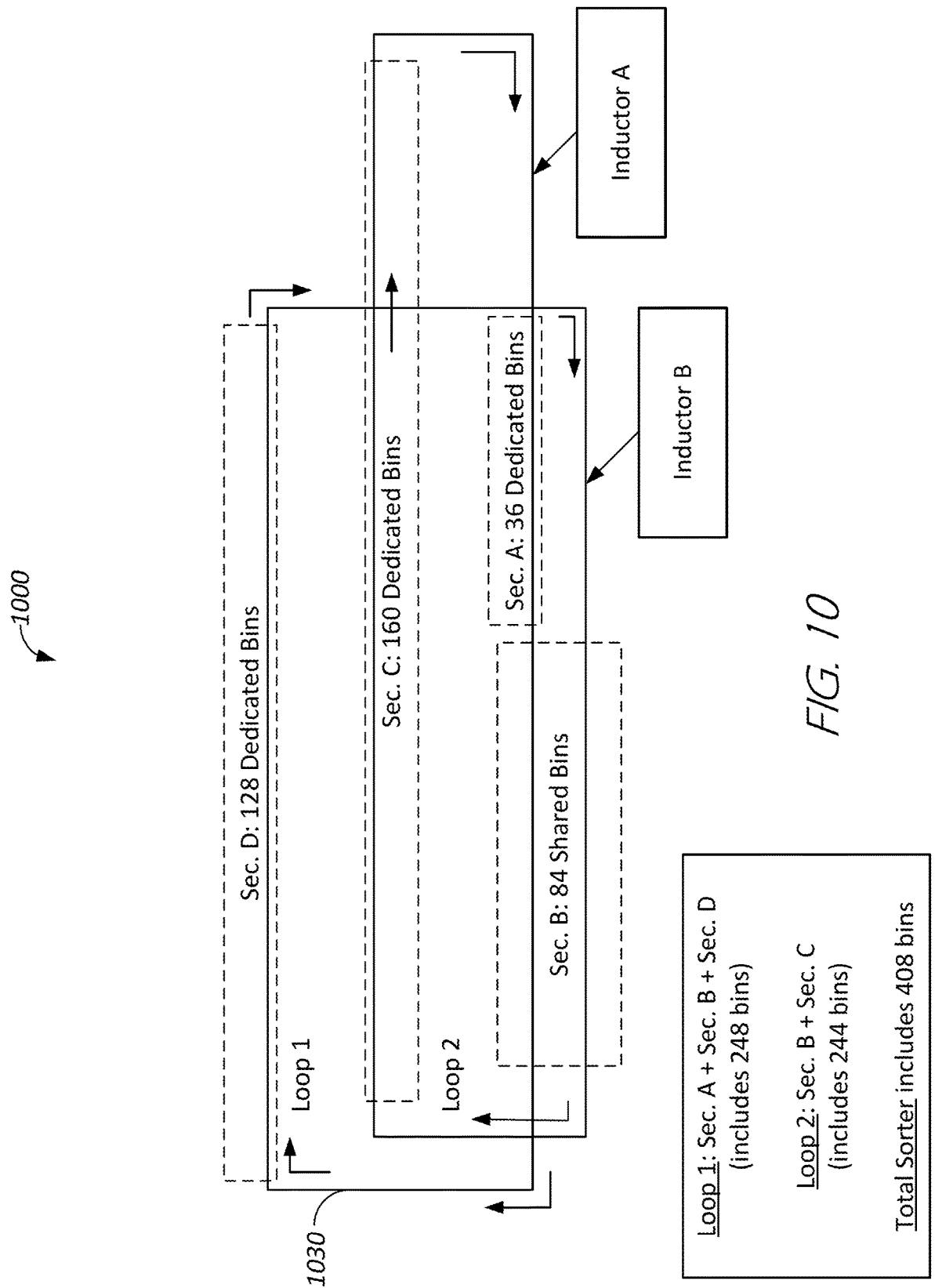
FIGS. 10-16 are block diagrams of several example layouts for sorting systems that can employ the methods and devices described herein for high throughput sorting.

FIG. 10 is a simplified top view of an embodiment of a sorting system 1000. The sorting system 1000 includes a sorter 1030. The sorter 1030 is configured as a double loop, including loop 1 and loop 2. Loop 1 feeds directly into loop 2, and loop 2 in turn feeds into loop 1. Loop 1 begins at a first inductor A and passes 36 dedicated bins in sorter section A, 84 shared bins in sorter section B, and 128 dedicated bins in sorter section D. Thus, loop 1 includes 248 bins, 84 of which are shared (accessible during both loop 1 and loop 2). Following loop 1, the sorter 1030 forms loop 2. Loop 2 begins at a second inductor B and passes the 84 shared bins in sorter section B and 160 dedicated bins in sorter section C. Thus, loop 2 includes 244 bins, 84 of which are shared (accessible during both loop 1 and loop 2). In total, the sorting system 1000 includes 408 bins. During loop 1, 248 bins of the 408 bins will be unloaded, and during loop 2, 244 bins of the 408 bins will be unloaded. Thus, the theoretical throughput for the system 1000 is 492/408, or approximately 1.21.

Figure 11:
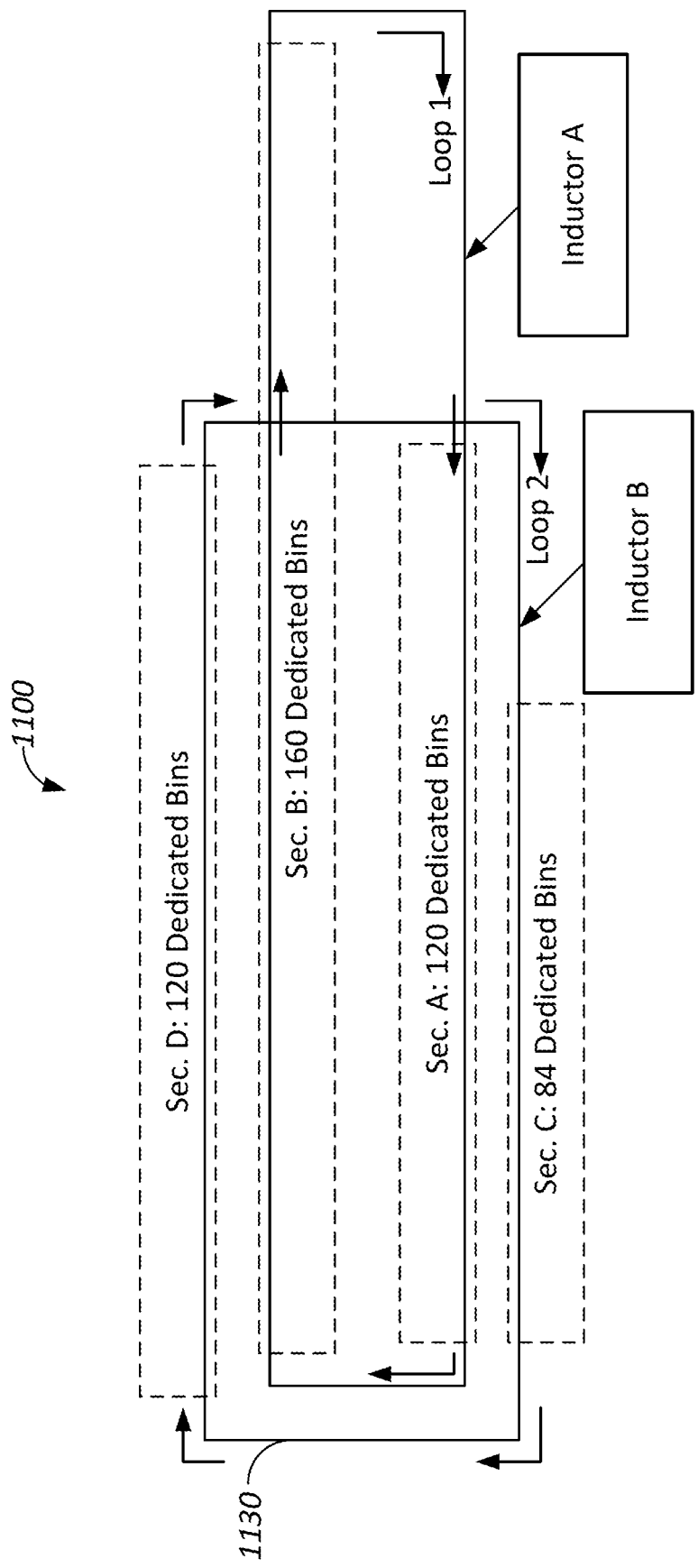

FIG. 11 is a simplified top view of an embodiment of a sorting system 1100. The sorting system 1100 includes a sorter 1130. The sorter 1130 is configured with two distinct and separate loops: loop 1 and loop 2. Loop 1 and loop 2 are not connected to each other. Loop 1 begins at a first inductor A and passes 120 dedicated bins in sorter section A and 160 dedicated bins in sorter section B. Thus, loop 1 includes dedicated 280 bins that are only accessible for items placed on loop 1 by inductor A. Loop 2 begins at a second inductor B and passes the 84 dedicated bins in sorter section C and 120 dedicated bins in sorter section D. Thus, loop 2 includes 204 dedicated bins that are only accessible to items placed on loop 2 by inductor B. In total, the sorting system 1100 includes 484 bins. Because the system 1100 does not include any shared bins, the theoretical throughput of the system 1100 is one (1).

Figure 12:
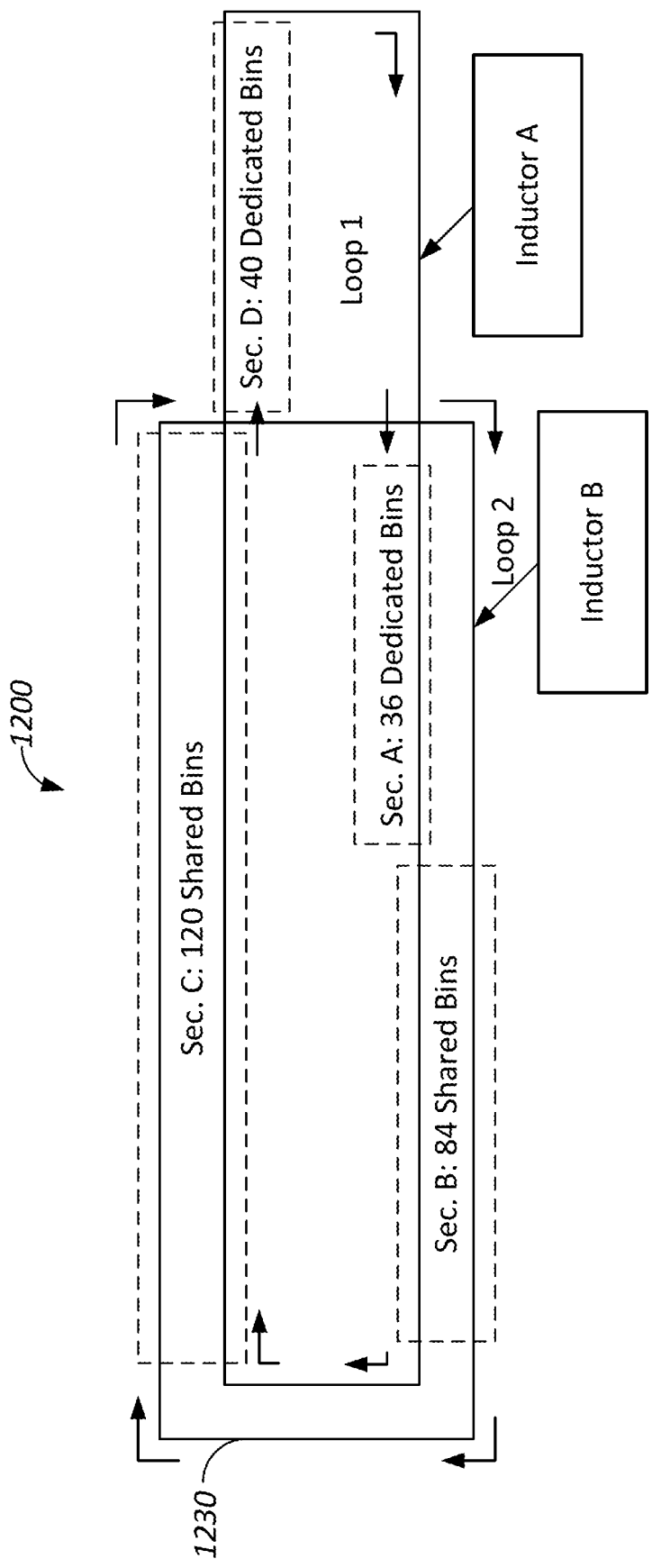

FIG. 12 is a simplified top view of an embodiment of a sorting system 1200. The sorting system 1200 includes a sorter 1230. Similar to the sorter 1130 of FIG. 11, the sorter 1230 is configured with two distinct and separate loops: loop 1 and loop 2. Loop 1 and loop 2 are not connected to each other. Loop 1 begins at a first inductor A and passes 36 dedicated bins in sorter section A, 84 shared bins in sorter section B, and 120 shared bins in sorter section C. Thus, loop 1 includes 280 bins, 204 of which are shared (accessible by both loop 1 and loop 2). Following loop 1, the sorter 1230 forms loop 2. Loop 2 begins at a second inductor B and passes the 84 shared bins in sorter section B and the 120 shared bins in sorter section C. Thus, loop 2 includes 204 bins, all of which are shared (accessible by both loop 1 and loop 2). In total, the sorting system 1200 includes 484 bins. During loop 1, 280 bins of the 484 bins will be unloaded, and during loop 2, 204 bins of the 484 bins will be unloaded. Thus, the theoretical throughput for the system 1200 is 484/484, or one (1). Although the system 1200 includes shared bins, the theoretical throughput is still one because each loop can only be loaded once per revolution, with inductor A loading loop 1 and inductor B loading loop 2.

Figure 13:
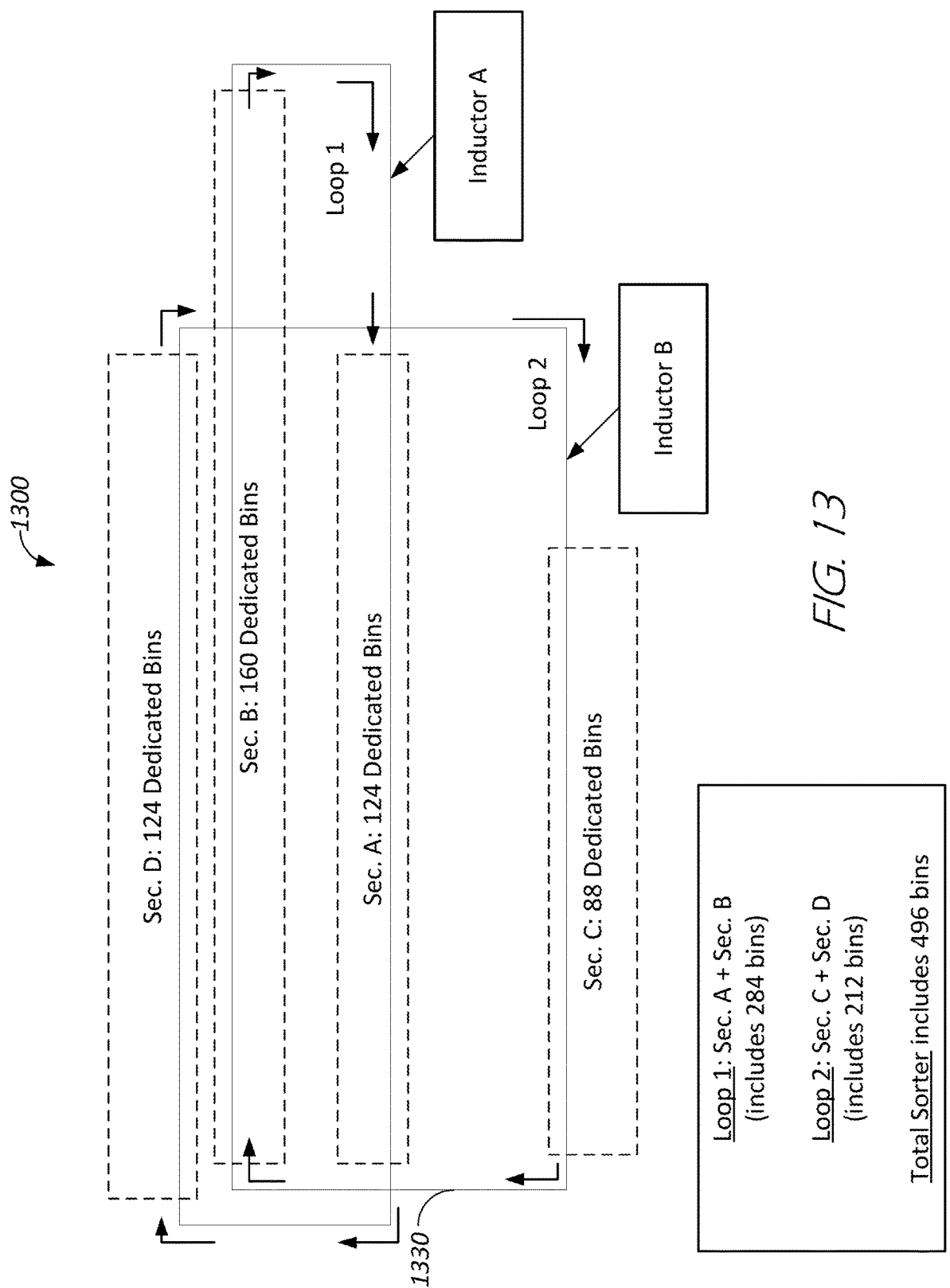

FIG. 13 is a simplified top view of an embodiment of a sorting system 1300. The sorting system 1300 includes a sorter 1330. The sorter 1330 is configured as a double loop, including loop 1 and loop 2. Loop 1 feeds directly into loop 2, and loop 2 in turn feeds into loop 1. Loop 1 begins at a first inductor A and passes 124 dedicated bins in sorter section A and 124 dedicated bins in sorter section B. Thus, loop 1 includes 284 dedicated bins that are accessible only during loop 1. Following loop 1, the sorter 1330 forms loop 2. Loop 2 begins at a second inductor B and passes 88 dedicated bins in sorter section C and 160 dedicated bins in sorter section B. Thus, loop 2 includes 212 dedicated bins only accessible during loop 2. In total, the sorting system 1300 includes 496 bins. During loop 1, 284 bins of the 496 bins will be unloaded, and during loop 2, 212 bins of the 496 bins will be unloaded. Thus, the theoretical throughput for the system 1300 is 496/496, or one (1) because the system 1300 does not include any shared bins.

Figure 14:
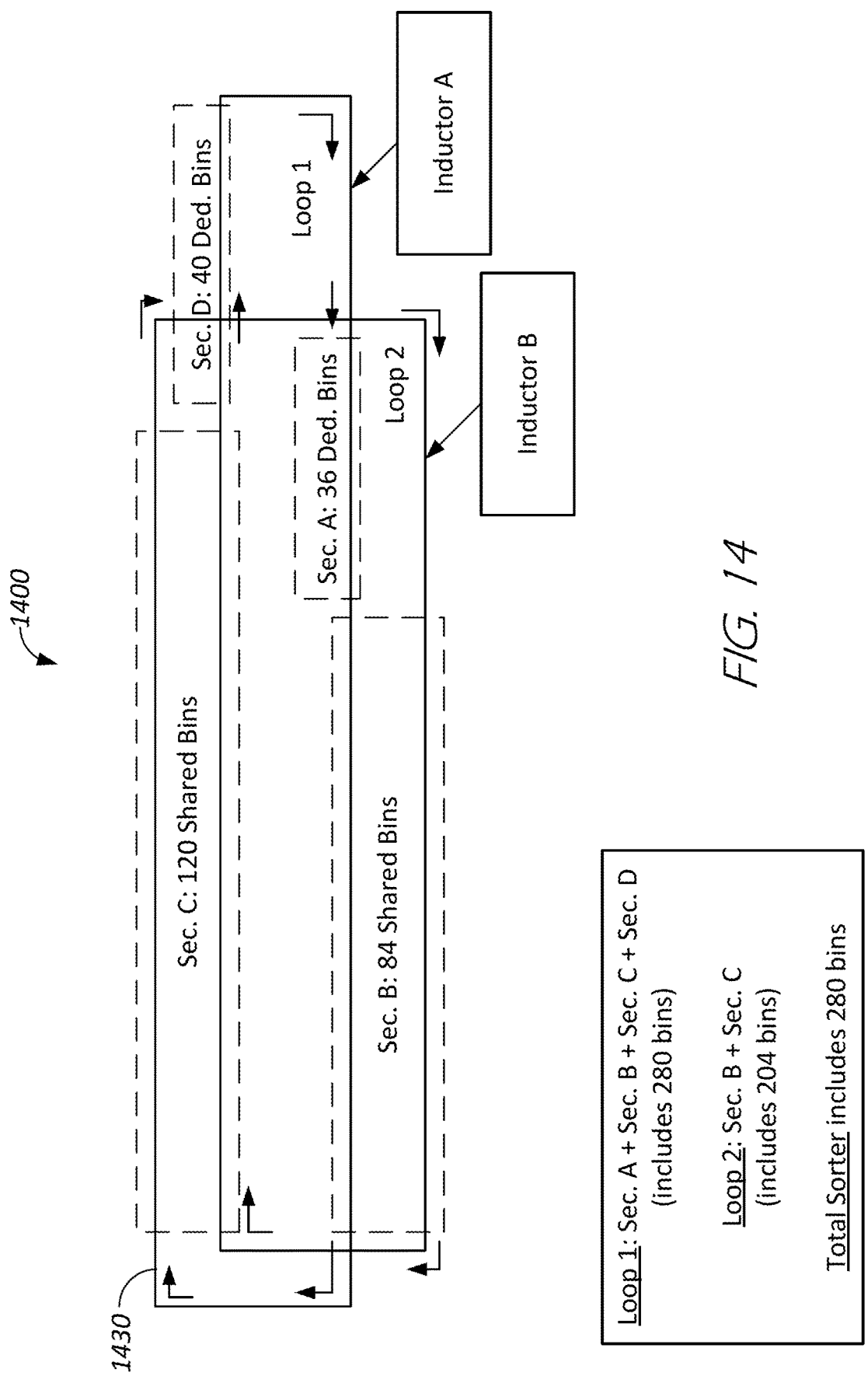

FIG. 14 is a simplified top view of an embodiment of a sorting system 1400. The sorting system 1400 includes a sorter 1430. The sorter 1430 is configured as a double loop, including loop 1 and loop 2. Loop 1 feeds directly into loop 2, and loop 2 in turn feeds into loop 1. Loop 1 begins at a first inductor A and passes 36 dedicated bins in sorter section A, 84 shared bins in sorter section B, and 120 shared bins in sorter section C. Thus, loop 1 includes 280 bins, 204 of which are shared (accessible during loop 1 and loop 2). Following loop 1, the sorter 1430 forms loop 2. Loop 2 begins at a second inductor B and passes the 84 shared bins in sorter section B and the 120 shared bins in sorter section C. Thus, loop 2 includes 204 shared bins (accessible during loop 1 and loop 2). In total, the sorting system 1400 includes 280 bins. During loop 1, 280 bins of the 280 bins will be unloaded, and during loop 2, 204 bins of the 280 bins will be unloaded. Thus, the theoretical throughput for the system 1400 is 484/280, or approximately 1.73.

Figure 15:
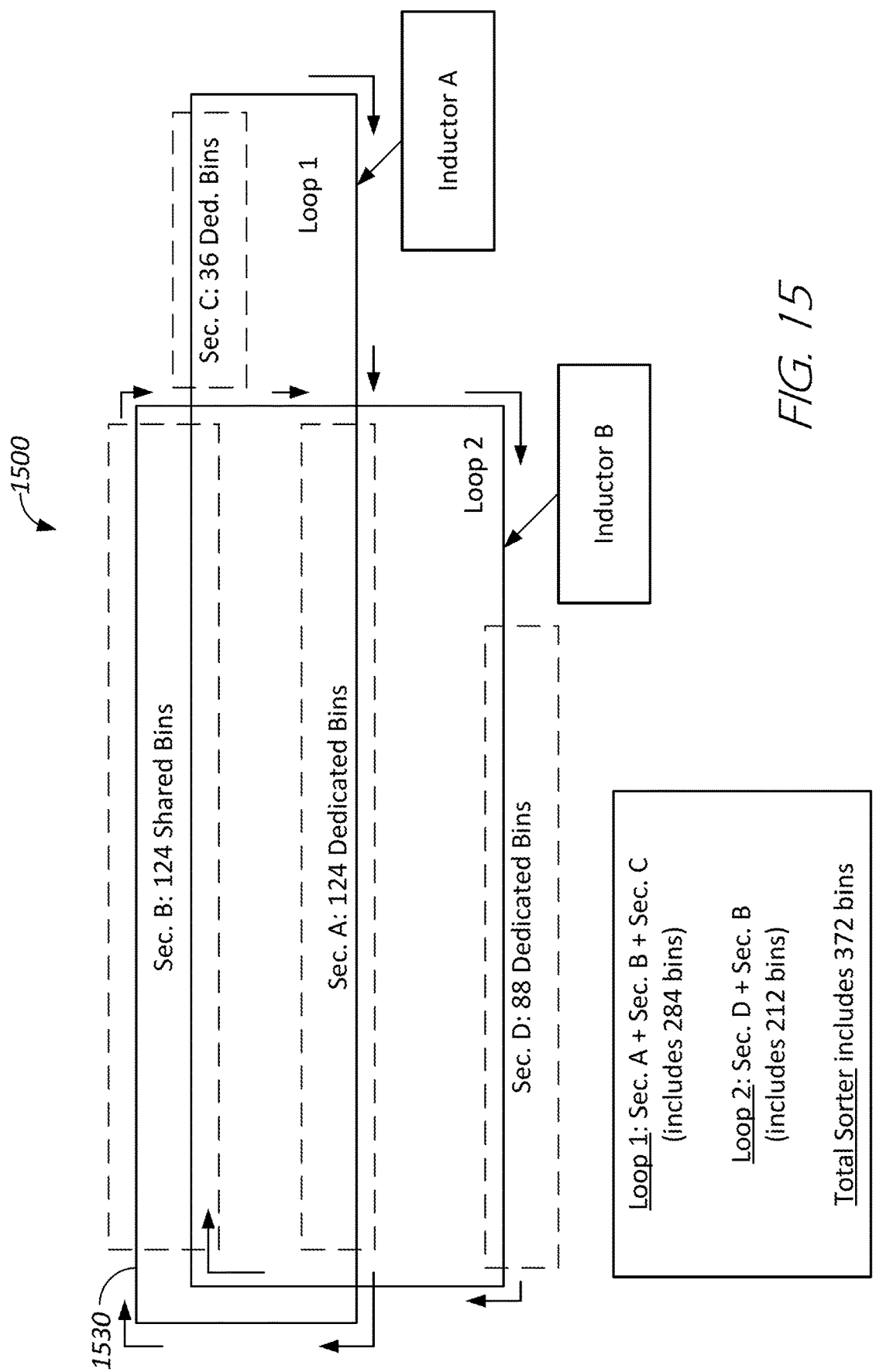

FIG. 15 is a simplified top view of an embodiment of a sorting system 1500. The sorting system 1500 includes a sorter 1530. The sorter 1530 is configured as a double loop, including loop 1 and loop 2. Loop 1 feeds directly into loop 2, and loop 2 in turn feeds into loop 1. Loop 1 begins at a first inductor A and passes 124 dedicated bins in sorter section A and 124 shared bins in sorter section B. Thus, loop 1 includes 248 bins, 124 of which are shared (accessible during loop 1 and loop 2). Following loop 1, the sorter 1530 forms loop 2. Loop 2 begins at a second inductor B and passes 88 dedicated bins in sorter section D, the 124 shared bins in sorter section B, and the 36 dedicated bins in sorter section C. Thus, loop 2 includes 248 bins, 124 of which are shared (accessible during loop 1 and loop 2). In total, the sorting system 1500 includes 372 bins. During loop 1, 284 bins of the 372 bins will be unloaded, and during loop 2, 212 bins of the 372 bins will be unloaded. Thus, the theoretical throughput for the system 1500 is 496/372, or approximately 1.33.

Figure 16:
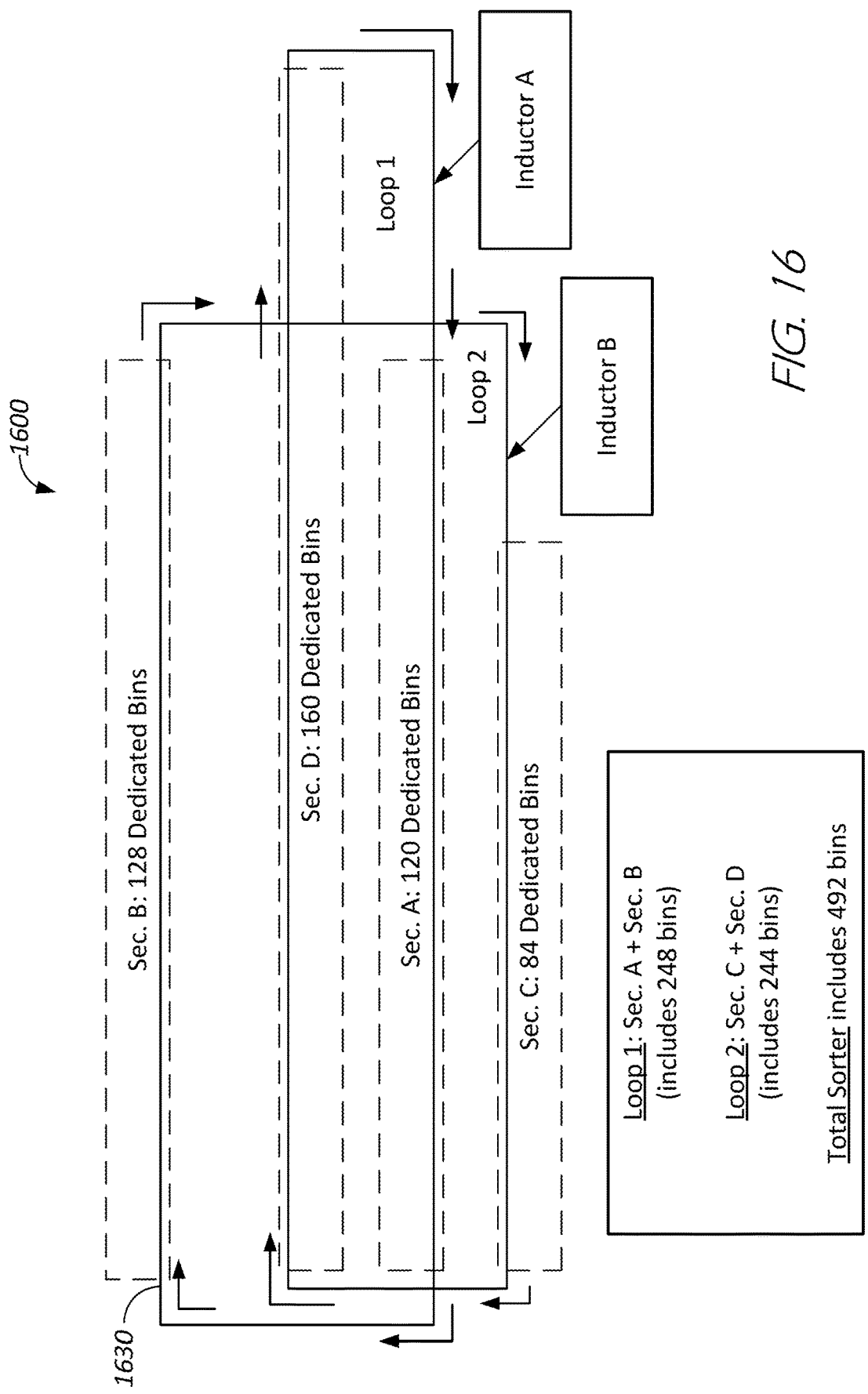

FIG. 16 is a simplified top view of an embodiment of a sorting system 1600. The sorting system 1600 includes a sorter 1630. The sorter 1630 is configured as a double loop, including loop 1 and loop 2. Loop 1 feeds directly into loop 2, and loop 2 in turn feeds into loop 1. Loop 1 begins at a first inductor A and passes 120 dedicated bins in sorter section A and 128 dedicated bins in sorter section B. Thus, loop 1 includes 248 dedicated bins that are accessible only during loop 1. Following loop 1, the sorter 1630 forms loop 2. Loop 2 begins at a second inductor B and passes 84 dedicated bins in sorter section C and 160 dedicated bins in sorter section D. Thus, loop 2 includes 244 dedicated bins that are accessible only during loop 2. In total, the sorting system 1600 includes 492 bins. The theoretical throughput of the system 1600 is one (1) because the system 1600 does not include any shared bins.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, inter-changed or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A sorting apparatus comprising:
    a first sorter loop;
    a second sorter loop, wherein at least a first portion of the first sorter loop and a first portion of the second sorter loop run parallel to each other;
    a first plurality of chutes disposed at least partially below the first portion of the first sorter loop and the first portion of the second sorter loop, the first plurality of chutes leading to a first plurality of sort destinations; and
    a second plurality of chutes disposed at least partially below a second portion of the first sorter loop, the second plurality of chutes leading to a second plurality of sort destinations; and
    wherein the first plurality of sort destinations are different than the second plurality of sort destinations.

2. The sorting apparatus of claim 1, wherein the first sorter loop and the second sorter loop comprise a continuous conveyor.

3. The sorting apparatus of claim 1, wherein the first sorter loop and the second sorter loop are independent conveyors.

4. The sorting apparatus of claim 1, wherein each of the first plurality of chutes are configured to direct an item from the first sorter loop to one of the first plurality of sort destinations and to direct an item from the second sorter loop to the one of the first plurality of sort destinations.

5. The sorting apparatus of claim 1, further comprising a third plurality of chutes disposed at least partially below a second portion of the second sorter loop, the third plurality of chutes leading to a third plurality of sort destinations.

6. The sorting apparatus of claim 5, wherein the second portion of the first sorter loop is not parallel to the second portion of the second sorter loop.

7. The sorting apparatus of claim 5, wherein each of the second plurality of chutes is configured to direct an item from the first sorter loop to one of the second plurality of sort destinations, and wherein each of the third plurality of chutes is configured to direct an item from the second sorter loop to one of the third plurality of sort destinations.

8. The sorting apparatus of claim 1, further comprising:
    a first inductor connected to the first sorter loop, the first inductor configured to deposit items into cells of the first sorter loop; and
    a second inductor connected to the second sorter loop, the second inductor configured to deposit items into cells of the second sorter loop.

9. The sorting apparatus of claim 1, wherein each of the first plurality of sort destinations lead to a first plurality of bins.

10. A high throughput sorting device, comprising:
    a sorter including a first sorter section, the first sorter section comprising a plurality of cells, each of the plurality of cells including a pair of doors forming a platform configured to:
        support an item when the pair of doors are in a closed configuration, and
        deposit the item from the cell when the pair of doors are in an open configuration, wherein the pair of doors comprise a leading door with having a first length and a trailing door having a second length, wherein the second length is less than the first length.

11. The device of claim 10, wherein a combined length of the first length and second length makes up the total length of one of the plurality of cells, and wherein the second length is from 10 percent to 50 percent of the total length of the one of the plurality of the cells.

12. The device of claim 11, wherein a combined length of the first length and second length makes up the total length of one of the plurality of cells, and wherein the second length is from 25 percent to 35 percent of the total length of the one of the plurality of the cells.

* * * * *